US008531681B2

(12) United States Patent
Sugahara et al.

(10) Patent No.: US 8,531,681 B2
(45) Date of Patent: Sep. 10, 2013

(54) MULTIFUNCTION PRINTER, PRINTING SYSTEM, PROGRAM FOR PRINTING STILL IMAGES FROM MOVIE IMAGE DATA

(75) Inventors: Hiroto Sugahara, Aichi-ken (JP); Kazuma Goto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1029 days.

(21) Appl. No.: 12/052,611

(22) Filed: Mar. 20, 2008

(65) Prior Publication Data

US 2008/0231872 A1 Sep. 25, 2008

(30) Foreign Application Priority Data

Mar. 22, 2007 (JP) ................................. 2007-074041

(51) Int. Cl.
*G06K 15/02* (2006.01)
*G06F 13/00* (2006.01)

(52) U.S. Cl.
USPC ........................................... 358/1.1; 358/1.16

(58) Field of Classification Search
None
See application file for complete search history.

(56) References Cited

U.S. PATENT DOCUMENTS

| 5,884,056 | A | 3/1999 | Steele |
| 6,883,892 | B2 * | 4/2005 | Sievert et al. ................... 347/19 |
| 7,009,726 | B2 * | 3/2006 | Lumley ........................ 358/1.15 |
| 7,221,470 | B2 | 5/2007 | Takamine et al. |
| 2003/0095785 | A1 | 5/2003 | Izumi |
| 2005/0128510 | A1 | 6/2005 | Campbell |
| 2005/0185158 | A1 * | 8/2005 | Matsuhira ........................ 355/40 |
| 2005/0229107 | A1 * | 10/2005 | Hull et al. ...................... 715/764 |
| 2006/0050321 | A1 | 3/2006 | Takahashi |
| 2007/0003222 | A1 | 1/2007 | Shingai |
| 2007/0174774 | A1 * | 7/2007 | Lerman et al. ................. 715/723 |

FOREIGN PATENT DOCUMENTS

| EP | 0782085 A1 | 12/1996 |
| EP | 1158766 A1 | 5/2000 |
| JP | 2003264660 A | 9/2003 |
| JP | 2005-244934 A | 12/2004 |
| JP | 2005080076 A * | 3/2005 |
| JP | 2005-244934 A * | 9/2005 |
| JP | 2006080652 A | 3/2006 |

OTHER PUBLICATIONS

Foreign Patent Document JP2005-244934A Contains a Derwent Abstract and A JPO Machine Translation.*
European Patent Office, European Search Report for Related EP Application No. 08005195 dated Jul. 9, 2008.

(Continued)

*Primary Examiner* — Vincent Rudolph
*Assistant Examiner* — Peter L Cheng
(74) *Attorney, Agent, or Firm* — Baker Botts L.L.P.

(57) ABSTRACT

A multifunction printer includes a scanner; a still image data-extracting section which extracts a plurality of still image data from inputted movie image data; a memory which stores a correlation between the extracted still image data and time positions thereof in the movie image data; a printing head which prints, on a first printing medium, a plurality of thumbnail images corresponding to the extracted still image data and the time positions; and a selected image-extracting section which specifies the time position in the movie image data corresponding to a selection mark marked by a user when the first printing medium is read by the scanner after the selection mark is marked by the user to the first printing medium and which extracts a still image data corresponding to the identified time position based on the correlation stored in the memory.

9 Claims, 25 Drawing Sheets

(56) References Cited

OTHER PUBLICATIONS

Mills, M et al., "A Magnifier Tool for Video Data" Striking a Balance, Monterey, May 3-7, 1992, [Proceedings of the Conference on Human Factors in Computing Systems], Reading, Addison Wesley, US, vol.-, pp. 93-98.

The State Intellectual Property Office of the People'S Republic of China; Notification of First Office Action in Chinese Patent Application No. 200810087246.1 mailed Oct. 9, 2009.

The State Intellectual Property Office of the People's Republic of China; Notification of Second Office Action in Chinese Patent Application No. 200810087246.1 mailed Apr. 21, 2010.

The State Intellectual Property Office of the People's Republic of China; Decision on Rejection in Chinese Patent Application No. 200810087246.1 mailed Nov. 2, 2010.

European Patent Office, Summons to Attend Oral Proceedings for European Patent Application No. 08005195.6, dated Oct. 21, 2011.

Patent Reexamination Board of The Chinese Patent Office, Notification of Reexamination for Chinese Patent Application No. 200810087246.1, issued May 31, 2012.

State Intellectual Property Office of the People'S Republic of China, Decision of the Reexamination for Chinese Patent Application No. 200810087246.1 (counterpart to above-captioned patent application), issued May 29, 2013.

* cited by examiner

| MOVIE IMAGE DATA ID | ABC | |
|---|---|---|
| FRAME NUMBER | TIME t | THUMBNAIL IMAGE DATA |
| F0 | 0 | DAT0 |
| F1 | T | DAT1 |
| F2 | 2T | DAT2 |
| ⋮ | ⋮ | ⋮ |
| Fn | nT | DATn |
| F(n+1) | (n+1)T | DAT(n+1) |
| ⋮ | ⋮ | ⋮ |

Fig. 18

| FRAME NUMBER | TIME t | THUMBNAIL IMAGE DATA |
|---|---|---|
| F0 | 0 | DAT0 |
| F1 | T | – |
| F2 | 2T | – |
| F3 | 3T | – |
| F4 | 4T | – |
| F5 | 5T | DAT5 |
| F6 | 6T | – |
| ⋮ | ⋮ | ⋮ |
| F(n−1) | (n−1)T | – |
| Fn | nT | DATn |
| F(n+1) | (n+1)T | – |
| ⋮ | ⋮ | ⋮ |

MULTIFUNCTION PRINTER, PRINTING SYSTEM, PROGRAM FOR PRINTING STILL IMAGES FROM MOVIE IMAGE DATA

CROSS REFERENCE TO RELATED APPLICATION

The present application claims priority from Japanese Patent Application No. 2007-074041, filed on Mar. 22, 2007, the disclosure of which is incorporated herein by reference in its entirety.

BACKGROUND OF THE INVENTION

1. Field of the Invention

The present invention relates to a multifunction printer, a printing system including the multifunction printer, and a still image printing program to be used for the multifunction printer.

2. Description of the Related Art

A technique has been hitherto known, in which a piece of still image data of a desired scene is extracted from a piece of movie image data composed of a plurality of pieces of still image data arranged in a chronological order, and a still image thereof is printed on a printing medium. For example, an image output device, which is described in U.S. Pat. No. 7,221,470 (Japanese Patent Application Laid-open No. 2003-264660), temporarily stores a plurality of pieces of still image data (frames) contained in movie image data. When an instruction to print a still image is inputted by the remote control operation by a user, a plurality of (for example, two) still images, which are disposed in the vicinity of the time at which the printing instruction is inputted, are displayed on a screen. Further, when an image, which is to be printed, is identified from the plurality of displayed images by the remote control operation by the user, the image data of the identified image is outputted to an image-forming device (for example, a color printer).

As described above, in the case of the image output device described in U.S. Pat. No. 7,221,470, the user specifies the scene which is contained in the movie image data and which is desired to be printed, and the user specifies the image to be printed, while viewing the screen by means of the remote control operation. Therefore, the printing of the desired image as extracted from the moving image is not easily performed by some users such as aged persons who are weak in the equipment operation.

SUMMARY OF THE INVENTION

An object of the present invention is to provide a multifunction printer which makes it possible to easily print a still image contained in a moving image even by a user who is weak in the equipment operation.

According to a first aspect of the present invention, there is provided a multifunction printer including: a scanner which reads an image printed on a printing medium; a still image data-extracting section which extracts a plurality of still image data, to be shown in a list, from inputted movie image data based on a predetermined time interval; a memory which stores a correlation between the plurality of the still image data extracted by the still image data-extracting section and time positions of the plurality of the still image data in the movie image data; a printing head which prints, on a first printing medium, a plurality of thumbnail images corresponding to the plurality of the still image data extracted by the still image data-extracting section and the time positions in the movie image data so that the plurality of thumbnail images and the time positions in the movie image data are shown in the list; and a selected image-extracting section which identifies a specific time position among the time positions in the movie image data, the specific time position corresponding to a selection mark marked by a user on the first printing medium based on the time positions printed on the first printing medium, when the first printing medium is scanned by the scanner after the selection mark has been marked on the first printing medium by the user, and which extracts a piece of still image data, among the plurality of the still image data, corresponding to the specific time position in the movie image data based on the correlation stored in the memory, as a to-be-printed still image data of which image is to be printed, wherein the printing head prints, on a second printing medium, the image of the to-be-printed still image data extracted by the selected image-extracting section.

According to the multifunction printer of the present invention, the plurality of pieces of the still image data for list indication are firstly extracted by the still image data-extracting section, and the correlation between the pieces of the still image data and the times in the movie image data is stored in the memory. The printing head prints, on the first printing medium, the plurality of thumbnail images corresponding to the plurality of pieces of the still image data and the time positions in the movie image data, and the plurality of still images are shown in the list.

After that, when the selection mark is marked by the user to an arbitrary position on the first printing medium in order to select the image intended to be printed based on the time position, and then the first recording medium is read by the scanner, then the selected image-extracting section specifies the time position in the movie image data corresponding to the position at which the selection mark is marked on the first recording medium, and the reference is made to the correlation stored in the memory to extract the still image data corresponding to the identified time position as the to-be-printed still image data. The to-be-printed still image data, which is extracted by the selected image-extracting section, may be one included in the plurality of pieces of the still image data for the list indication extracted by the still image data-extracting section as described above (i.e., the still image data corresponding to the thumbnail image subjected to the list indication). Alternatively, the to-be-printed still image data may be any still image data which is positioned between the pieces of the still image data to be shown in the list and for which no thumbnail image is shown. The printing head prints, on the second printing medium, the image of the extracted to-be-printed still image data.

In other words, the user views the list indication of the thumbnail images of the plurality of pieces of the still image data printed on the first printing medium, and the user marks the selection mark on the first printing medium in order to select the image intended to be printed. The desired still image data is extracted by merely allowing the scanner to read the first printing medium marked with the selection mark. The image is printed on the second printing medium. Therefore, it is unnecessary for the user to perform any special operation which is not performed during the ordinary image printing. Therefore, even in the case of any user who is weak in the equipment operation, the user can easily and conveniently print the still image of any desired scene included in the moving image.

The term "time position" referred to in the following description means the information including, for example, the information about the elapsed time from the start of the movie image data and the information including, for example, the frame number corresponding to the elapsed time.

In the multifunction printer of the present invention, the printing head may print, on the first printing medium, a movie image identification mark for identifying the movie image data together with the plurality of thumbnail images; and the selected image-extracting section may identify the movie image data from which the to-be-printed still image data is to be extracted, based on the movie image identification mark printed on the first printing medium. In this arrangement, when the first printing medium marked with the selection mark is read by the scanner, the selected image-extracting section specifies the movie image data from which the printing request image data is to be extracted, from the moving image identification mark printed on the first printing medium. Therefore, it is unnecessary for the multifunction printer to inquire of the user about from which movie image data the to-be-printed still image data is to be extracted.

In the multifunction printer of the present invention, the still image data-extracting section may extract the plurality of the still image data from the movie image data while dividing the plurality of the still image data into a plurality of still-image data groups; the printing head may print, on one sheet of the first printing medium, a group identification mark corresponding to one of the still-image data groups together with the thumbnail images of still image data belonging to the one of the still-image data groups; and the selected image-extracting section may identify a specific still-data group among the still-data groups, from which the to-be-printed still image data is to be extracted, based on the group identification mark printed on the first printing medium. When the plurality of thumbnail images are shown in the list over a plurality of sheets of the first printing medium, the plurality of pieces of the still image data are extracted from the movie image data while being dividing them into the plurality of groups in order to determine on which sheet of the first recording medium each of the thumbnail images is to be printed. The thumbnail images of the pieces of the still image data belonging to one group are printed on the identical first printing medium, and the group identification mark corresponding to the group is printed on the identical first printing medium. When the first printing medium marked with the selection mark is read by the scanner, the selected image-extracting section specifies the group from which the to-be-printed still image data is to be extracted, from the group identification mark printed on the first printing medium. Therefore, it is unnecessary for the multifunction printer to inquire of the user about from which group the to-be-printed still image data is to be extracted.

In the multifunction printer of the present invention, when the selection mark is marked in a predetermined form to designate a time position range in the movie image data, the still image data-extracting section may finely divide the time position range in a time sequence manner to further extract a plurality of still image data from the time position range; and the printing head may print, on the first printing medium, thumbnail images of the plurality of the still image data extracted further from the time position range by the still image data-extracting section. In this arrangement, the thumbnail images can be indicated in the list while further finely dividing them in a time sequence manner within the time position range instructed by the user. Therefore, the optimum image (image of the scene intended to be printed most desirably) can be easily selected by the user.

In the multifunction printer of the present invention, when two positions on the first printing medium are marked with the selection mark respectively, the still image data-extracting section may finely divide a time-position range of time positions in the movie image data in the time sequence manner, the time positions corresponding to the two positions each marked with the selection mark on the first printing medium, to further extract the plurality of pieces of the still image data from the time-position range. In this arrangement, it is possible to instruct the multifunction printer so that the fine division is performed within the time range between the two selection marks to show the still images again, by merely performing the easy operation such that the two selection marks are marked to the first printing medium.

In the multifunction printer of the present invention, the selection mark may have two forms; when two positions on the first printing medium are marked with a first-form selection mark respectively, the selected image-extracting section may extract two pieces of the still image data at time positions corresponding to the two positions each marked with the first-form selection mark, as two pieces of the to-be-printed still image data from the movie image data; and when two positions on the first printing medium are marked with a second-form selection mark respectively, the still image data-extracting section finely may divide a time-position range of time positions in the movie image data in the time sequence manner, the time positions corresponding to the two positions each marked with the second-form selection mark, to further extract a plurality of pieces of the still image data from the time position range. In this arrangement, it is possible to recognize, on the side of the multifunction printer, whether the image selection or the fine division indication is required, by merely changing the form of the selection mark between the case in which the printing image is selected and the case in which the fine division is performed to show the still image again.

In the multifunction printer of the present invention, when the selection mark is marked between two positions corresponding to certain two of the thumbnail images respectively on the first printing medium, the selected image-extracting section may extract, as the to-be-printed still image data, pieces of the still image data from a range comparted by time positions of two pieces of the still image data corresponding to the two thumbnail images. In this arrangement, not only the pieces of the still image data as the sources of the still images subjected to the list indication but also the pieces of the still image data temporally positioned between the pieces of the still image data can be extracted as the to-be-printed still image data. Therefore, the image, which is more appropriate for the printing than any image of the still image data as the source of the still image, can be selected by the user, and the image can be printed. In other words, the number of the still images printed on the first printing medium is decreased by increasing the indication or display intervals of the still images, while the user can select the optimum image (image of the scene intended to be printed most desirably).

According to a second aspect of the present invention, there is provided a printing system comprising the multifunction printer as defined in the first aspect, and a controller which controls the multifunction printer.

According to the printing system of the second aspect of the present invention, it is unnecessary for the user to perform any special operation for the multifunction printer in order to print the still image. Therefore, even in the case of the user who is weak in the equipment operation, it is possible to easily and conveniently print the still image of the desired scene in the moving image.

According to a third aspect of the present invention, there is provided a still image-printing program which is usable for a multifunction printer including a printing head printing an image on a printing medium and a scanner reading the image printed on the printing medium, which is usable for extracting still image data from movie image data to print the still image data, and which causes the multifunction printer to execute steps including: a still image data-extracting step for extracting a plurality of pieces of the still image data, which are to be shown in a list, from the movie image data based on a predetermined time interval; a storing step for storing, in a memory, a correlation between the plurality of pieces of the still image data extracted in the still image data-extracting step and time positions of the plurality of pieces of the still image data in the movie image data; a first printing step of printing, on a first printing medium, a plurality of thumbnail images and the time positions in the movie image data corresponding to the plurality of pieces of the still image data extracted in the still image data-extracting step with the printing head so that the plurality of thumbnail images and the time positions in the movie image data are indicated in a list; a selected image-extracting step for identifying the time position in the movie image data corresponding to a selection mark when the first printing medium is read by the scanner after the selection mark has been marked by a user to the first printing medium based on the time positions printed on the first printing medium, and extracting, as to-be-printed still image data from the movie image data, a piece of the still image data corresponding to the identified time position in the movie image data based on the correlation stored in the memory; and a second printing step of printing, on a second printing medium, a still image of the to-be-printed still image data extracted in the selected image-extracting step, by the printing head.

According to the still image-printing program of the third aspect of the present invention, it is possible to obtain the effect which is the same as or equivalent to those obtained by the first aspect.

BRIEF DESCRIPTION OF THE DRAWINGS

FIG. 18 shows a correlation among the frame number of the still image data, the time in the movie image data, and the thumbnail image data to be stored in a correlation-storing section in the third embodiment.

DESCRIPTION OF THE PREFERRED EMBODIMENTS

Figure 1:
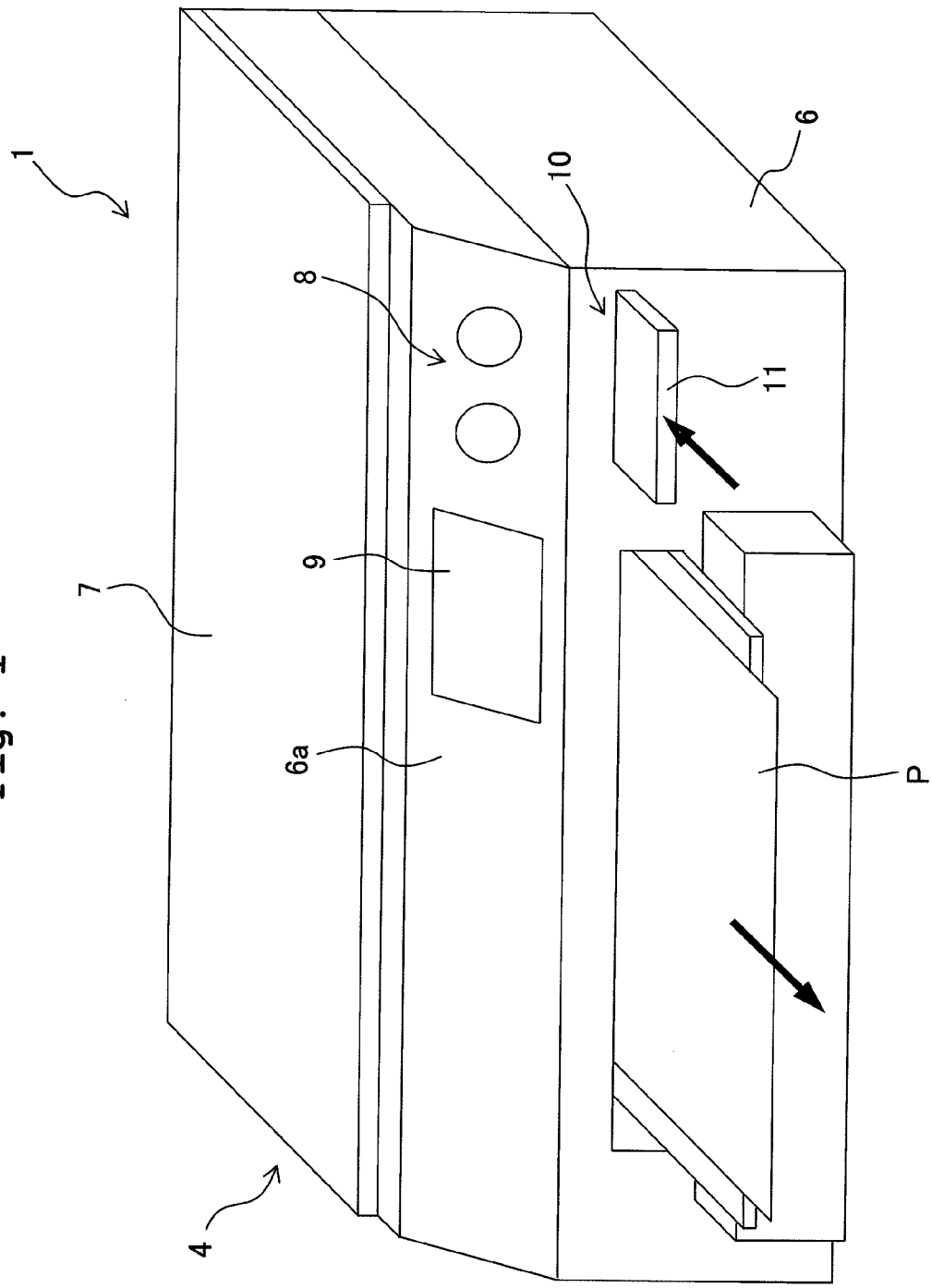
FIG. 1 schematically shows an appearance of a multifunction printer according to a first embodiment of the present invention.
Figure 2:
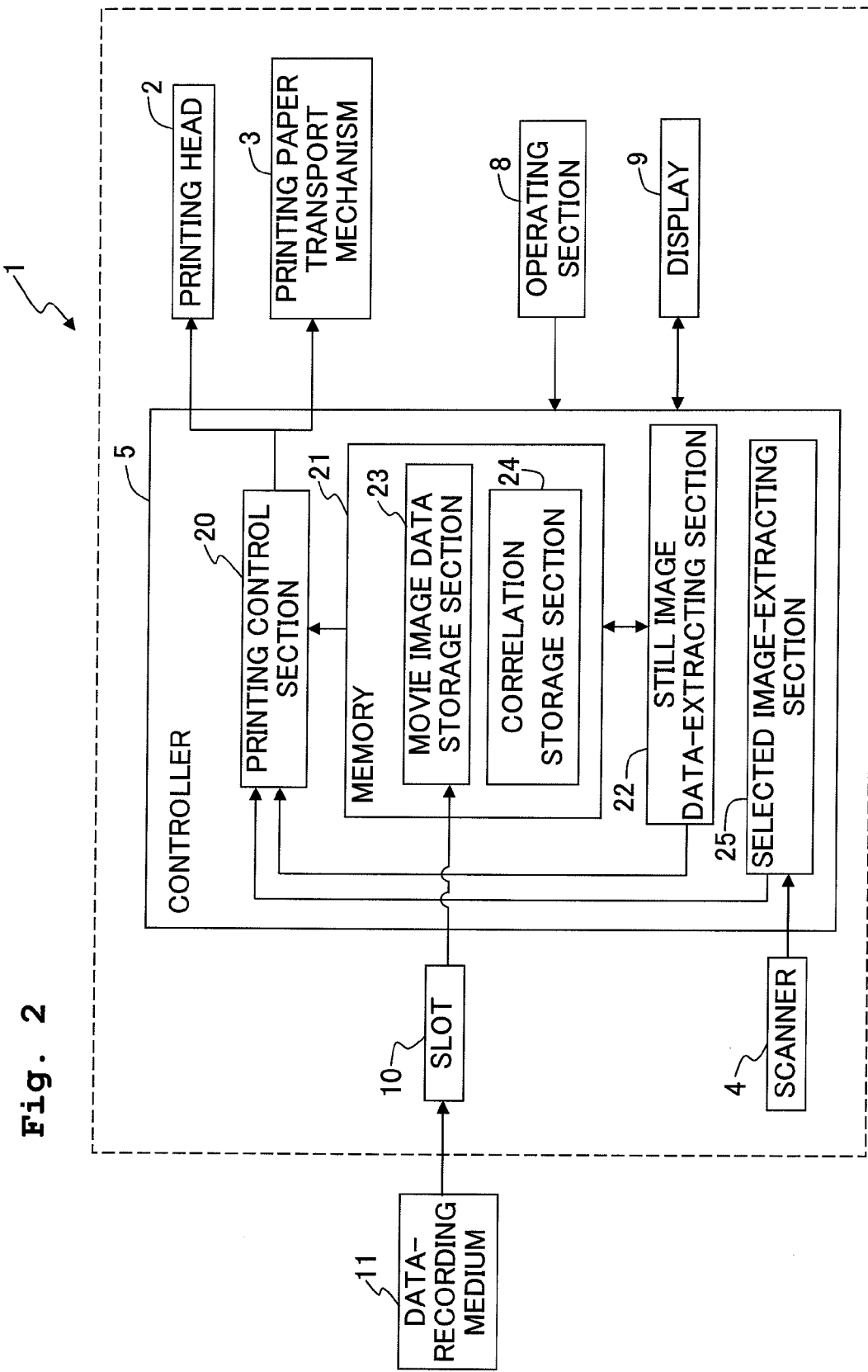
FIG. 2 shows a block diagram schematically illustrating an electric configuration of the multifunction printer.
Figure 3A:
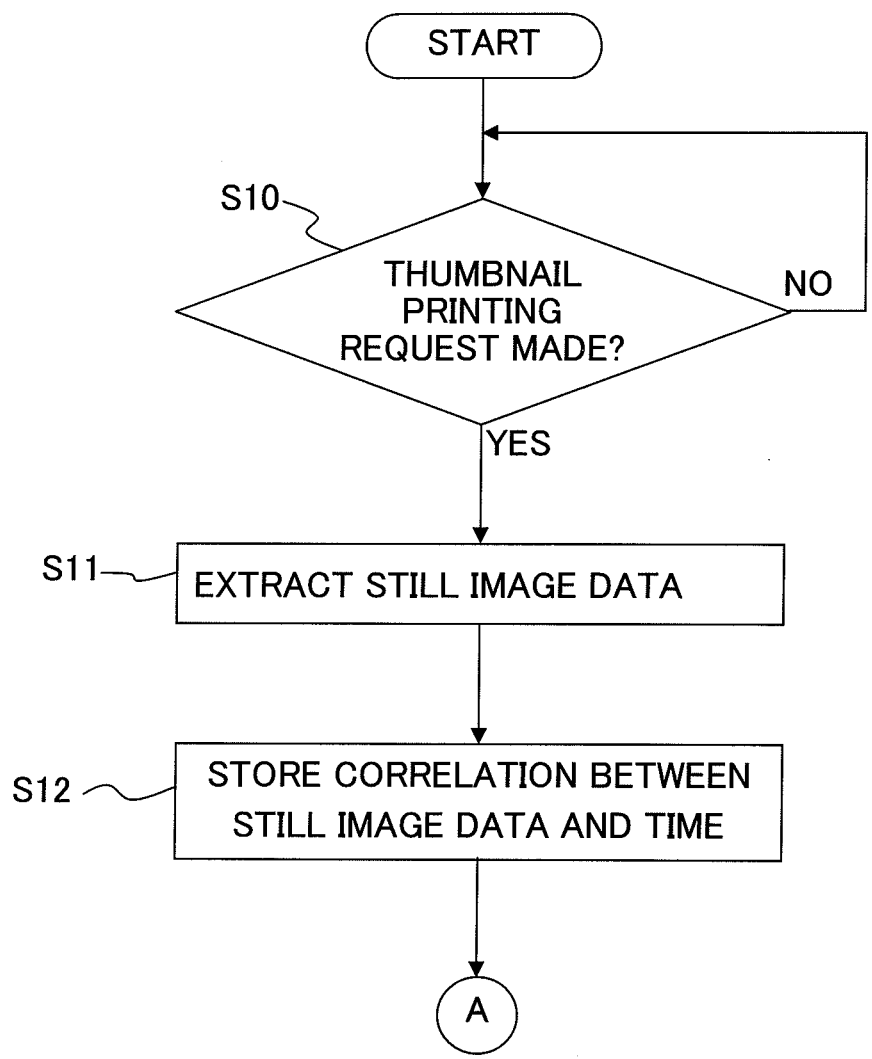
FIGS. 3A and 3B show a flow chart illustrating a still image-printing process.
Figure 3B:
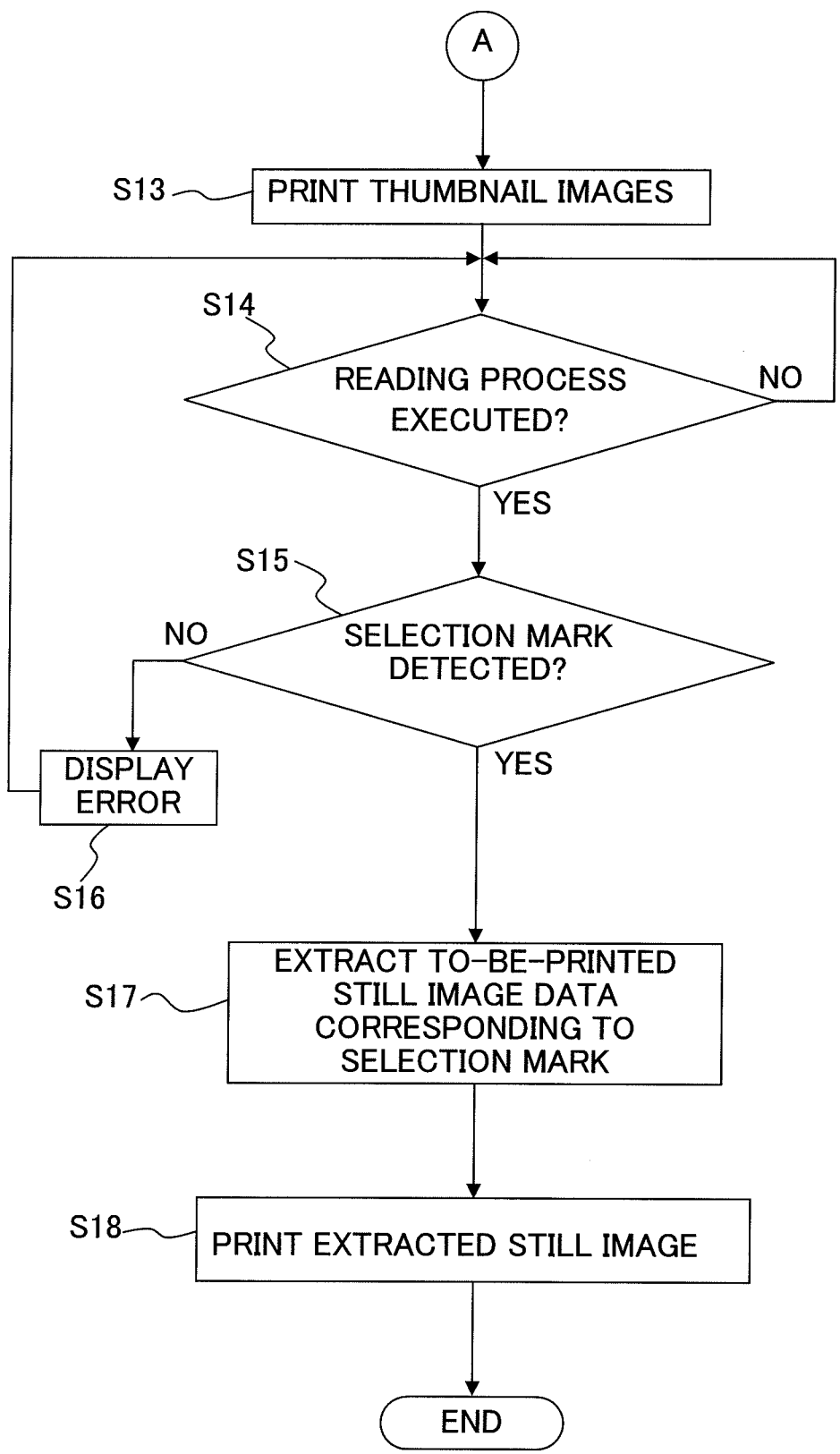

Next, a first embodiment of the present invention will be explained. FIG. 1 schematically shows an appearance of a multifunction printer according to a first embodiment. FIG. 2 shows a block diagram schematically illustrating an electric configuration of the multifunction printer.

As shown in FIGS. 1 and 2, the multifunction printer 1 of this embodiment comprises a printing head 2 which prints an image on the printing paper P (printing medium), a printing paper transport mechanism 3 which transports the printing paper P in a predetermined direction (frontward direction as shown in FIG. 1), a scanner 4 which reads the image printed on the printing paper P, and a controller 5 which controls various mechanisms of the multifunction printer 1 including, for example, the printing head 2, the printing paper transport mechanism 3, and the scanner 4 respectively.

As shown in FIG. 1, the multifunction printer 1 has a main printer body 6 having a substantially rectangular parallelepiped shape. For example, the printing head 2 and the printing paper transport mechanism 3 are accommodated in the main printer body 6. Those usable as the printing head 2 include those based on the known system including, for example, the ink-jet system, the laser system, and the thermal transfer system for performing the printing on the printing paper P. The printing paper transport mechanism 3 is constructed such that the printing paper P is transported in the predetermined direction by means of the transport rollers driven and rotated by a motor.

The scanner 4 is provided at an upper portion of the main printer body 6. As shown in FIG. 1, the scanner 4 is provided with a placing stand (not shown) which is composed of a glass plate, a reading unit (not shown) which is arranged under the placing stand, and a cover 7 which covers the upper surface of the placing stand. The scanner 4 is constructed such that an image, which is printed on a manuscript, is read by the reading unit in a state in which the cover 7 is closed after the manuscript is placed on the upper surface of the placing stand.

An inclined surface 6a is formed at a front upper portion of the main printer body 6. The inclined surface 6a is provided with an operating section 8 which is composed of a plurality of operation buttons to be operated by a user, and a display 9 which displays, for example, the error message and the operation state of the multifunction printer 1. A slot 10, to which a data-recording medium 11 such as a memory card is installed, is provided at a front right portion of the main printer body 6. The data including, for example, the movie image data and the image data recorded on the data-recording medium 11 is read in the slot 10, and the data is inputted into the controller 5.

In the following description, it is assumed that various pieces of the data such as the movie image data are inputted from the data-recording medium 11 via the slot 10 into the multifunction printer 1 for the convenience of explanation. However, the data input into the multifunction printer 1 is not limited to such a system. For example, the multifunction printer 1 may be connected to a digital video camera by means of a cable, and the data may be inputted into the multifunction printer 1 via the cable. Alternatively, the data may be inputted into the multifunction printer 1, for example, from a mobile phone equipped with the video photographing function via the wireless communication based on the use of, for example, the infrared light.

Next, an explanation will be made with reference to FIG. 2 about the electric configuration of the multifunction printer 1 including the central unit of the controller 5. The controller 5 comprises, for example, CPU (Central Processing Unit) which serves as the central processing unit, ROM (Read Only Memory) which stores, for example, the program and the data to control the various mechanisms of the multifunction printer 1, RAM (Random Access Memory) which temporarily stores the data to be processed by CPU, and an input/output interface which inputs/outputs the signal with respect to the external device.

As shown in FIG. 2, the controller 5 has a printing control section 20, and a storage section 21 which stores the image data and the movie image data inputted from the data-recording medium 11 installed to the slot 10. When the printing instruction is inputted from the operating section 8 by the user, the printing control section 20 controls the printing head 2 and the printing paper transport mechanism 3 respectively based on the data stored in the storage section 21. Accordingly, the desired image is printed on the printing paper P in this arrangement. Further, the controller 5 displays, on the display 9, for example, the error message and the state of the multifunction printer 1 (printing state or waiting state) to inform the user of the information.

Additionally, the multifunction printer 1 of the embodiment of the present invention has the following unique feature which is not possessed by any conventional multifunction machine. That is, in this arrangement, a plurality of pieces of the still image data are extracted from the movie image data inputted from the data-recording medium 11 in response to the request from the user via the operating section 8 so that thumbnail images 30 (reduced images) of the plurality of pieces of the still image data can be printed on the printing paper P (thumbnail image-printing process: see FIG. 6). Further, in this arrangement, when the printing paper sheet P1 is read by the scanner 4 in such a state that a selection mark 31, which selects the image to be subjected to the magnified printing, is marked by the user to the printing paper sheet P1 (first recording medium) on which the thumbnail images 30 have been printed, then the still image data corresponding to the selection mark 31 can be extracted to print the image 32 on another printing paper sheet P2 (second recording medium) (selected image-printing process: see FIG. 8). This unique feature will be explained in detail below.

As shown in FIG. 2, the controller 5 has a still image data-extracting section 22 which extracts the plurality of pieces of the still image data for the list indication or display (thumbnail indication), from the inputted movie image data. Further, the storage section 21 (memory) of the controller 5 has a movie image data storage section 23 which temporarily stores the movie image data inputted from the data-recording medium 11, and a correlation storage section 24 which stores the correlation between the plurality of pieces of the still image data extracted by the still image data-extracting section 22 and the times thereof as counted in the movie image data. Further, the controller 5 is provided with a selected image-extracting section 25 which extracts, from the movie image data, the still image data (to-be-printed still image data) corresponding to the selection mark 31 when the printing paper sheet P1, to which the selection mark 31 has been marked by the user, is read by the scanner 4.

For example, the printing control section 20, the still image data-extracting section 22, the correlation storage section 24, and the selected image-extracting section 25 are realized, for example, by CPU, ROM, and RAM which constitute the controller 5. In other words, ROM of the controller 5 stores a still image-printing program in order to extract the still image data from the movie image data and print the still image data. The respective functions of, for example, the printing control section 20, the still image data-extracting section 22, the correlation storage section 24, and the selected image-extracting section 25 are realized by executing the program stored in ROM by means of CPU of the controller 5.

Next, an explanation will be made with reference to a flow chart shown in FIG. 3 and FIGS. 4 to 8 about a series of the still image-printing process including the thumbnail image-printing process and the selected image-printing process realized by the controller 5 of the first embodiment. However, in FIG. 3, Si (i=10, 11, 12 . . . ) indicates each of the steps.

Next, the thumbnail image-printing process will be explained. At first, when the instruction, which requires the execution of the thumbnail image printing for the predetermined movie image data recorded on the data-recording medium 11, is inputted from the operating section 8 by the user (S10: Yes), the still image data-extracting section 22 extracts a plurality of pieces of the still image data from the movie image data (S11: still image data-extracting step).

Specifically, at first, when the instruction of the thumbnail image printing is inputted by the user via the operating section 8 in a state in which the data-recording medium 11 is inserted into the slot 10, the controller 5 displays, on the display 9, a list of the movie image data (file names) stored in the data-recording medium 11. When one piece of the movie image data, which is included in the list, is selected by the user by the aid of the operating section 8, then the selected movie image data is read by the slot 10, and the movie image data is temporarily stored in the movie image data storage section 23.

Figures 4, 5:
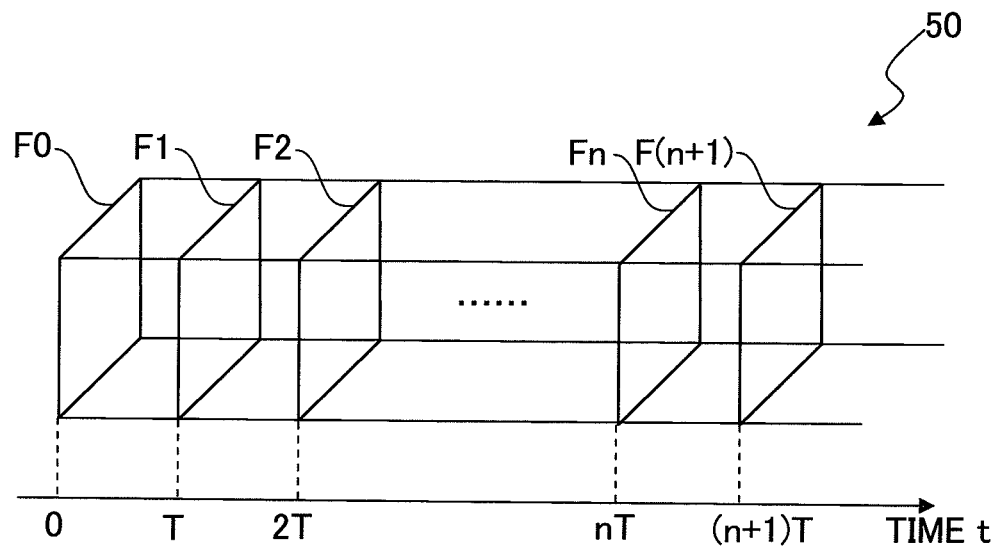
FIG. 4 conceptually shows the extraction of still image data.
FIG. 5 shows a correlation among the frame number of the still image data, the time in the movie image data, and the thumbnail image data to be stored in a correlation-storing section.

As shown in FIG. 4, the still image data-extracting section 22 cuts out or slices out a plurality of pieces of the still image data (frames) at equal time intervals T from the movie image data 50 stored in the movie image data storage section 23. That is, a plurality of frames (F0, F1, F2, . . . , Fn, F(n+1), . . . ), at which the times (points or moments of time) t as counted in the movie image data are 0, T, 2T, ..., nT, (n+1)T respectively, are extracted. Further, the thumbnail image data (DAT0, DAT1, DAT2, ...) for the list indication, in which the image size is decreased, are generated for the plurality of pieces of the extracted still image data respectively.

The time interval T, at which the still image data-extracting section 22 extracts the plurality of pieces of the still image data for the list indication from the movie image data 50, may be a preset fixed value or any value which is to be arbitrarily set by the user by the aid of the operating section 8. Alternatively, the still image data-extracting section 22 may set an appropriate value of the time interval T depending on the total period of time of the movie image data as the data extraction objective. For example, when the still image data are extracted from the movie image data in which the total period of time is long, the time interval T is increased. On the other hand, when the still image data are extracted from the movie image data in which the total period of time is short, the time interval T is decreased (made fine).

Subsequently, as shown in FIG. 5, the correlation storage section 24 stores the frame numbers (F0, F1, F2, ...) of the plurality of pieces of the still image data extracted by the still image data-extracting section 22, the times t of the still image data as counted in the movie image data, and the thumbnail image data (DAT0, DAT1, DAT2, ...) while allowing them to correspond to one another (S12: storing step). The movie image data ID ("ABC") is marked to the data which indicate the correlation thereof in order to identify the movie image data from which the still image data are extracted.

When the processes until S12 are completed, the printing control section 20 controls the printing head 2 based on the correlation between the times t in the movie image data and the plurality of pieces of the still image data (DAT0, DAT1, DAT2, ...) stored in the correlation storage section 24 as shown in FIG. 5. That is, the printing head 2 prints, on the printing paper sheet P1, the plurality of thumbnail images 30 corresponding to the plurality of pieces of the still image data so that the plurality of thumbnail images 30 are indicated as a list in correlation with the times counted in the movie image data (S13: first printing step).

Figure 6:
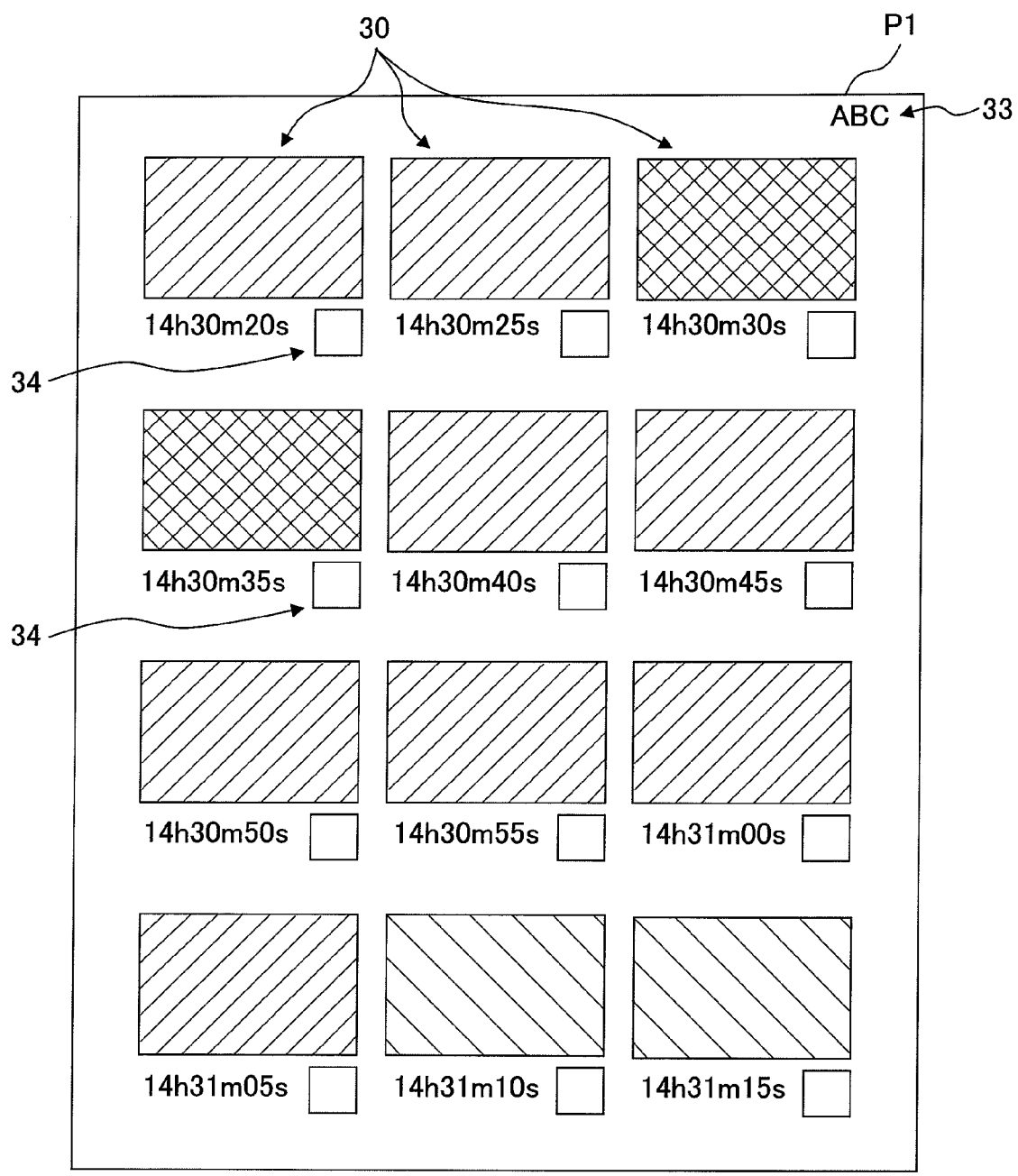
FIG. 6 shows a state in which a plurality of thumbnail images are printed on a printing paper sheet (first printing medium).

FIG. 6 shows a specified example of the printing of the plurality of thumbnail images 30. In FIG. 6, twelve of the thumbnail images 30, which are included in the thumbnail images 30 of the plurality of pieces of the still image data extracted at the time interval of 5 seconds (T=5 s) from the movie image data, are printed on one sheet of the printing paper P1. In this case, the thumbnail image 30, which has the earliest time of those of the twelve thumbnail images 30, is printed at the upper-left position (left end on the first row) of the printing paper sheet P1. The thumbnail images 30, which have the elapsed times therefrom, are printed on the right side thereof. Further, the thumbnail images 30, which have the later times as compared with the thumbnail image 30 disposed at the right end in each of the rows (lateral arrays), are printed at the left ends of the rows disposed thereunder. In other words, the twelve thumbnail images 30 are printed sequentially from the upper-left position to the lower-right position of the printing paper sheet P1 depending on the times of the original still image data as counted in the movie image data.

Further, the printing head 2 prints the movie image data ID 33 ("ABC": moving image identification mark) to identify the movie image data from which the still image data are extracted, at the upper-right position of the printing paper sheet P1. Further, the printing head 2 prints the time of the still image data corresponding to the thumbnail image 30 and a check box 34 at the positions disposed just under each of the thumbnail images 30. In this case, the plurality of thumbnail images 30 are printed at the positions corresponding to the times of the corresponding pieces of the still image data as counted in the movie image data. Therefore, the plurality of check boxes 34, which correspond to the plurality of thumbnail images 30 respectively, are also printed at the positions corresponding to the times counted or measured in the movie image data. The number of the thumbnail images 30 to be printed on one sheet of the printing paper P1 is determined depending on the time interval T to extract the plurality of pieces of the still image data for the list indication from the movie image data 50 by the still image data-extracting section 22. However, it is also allowable to determine the time interval T to extract the plurality of pieces of the still image data for the list indication from the movie image data 50 by the still image data-extracting section 22, based on the number of the thumbnail images 30 to be printed on one sheet of the printing paper P1 as being set by the user by the aid of the operating section 8.

The thumbnail image data are unnecessary after the thumbnail images 30 are printed. Therefore, the thumbnail image data may be erased from the correlation storage section 24. However, the correlation between the frame numbers (F0, F1, F2, ...) and the times t counted in the movie image data shown in FIG. 5 is not erased, because the correlation is required to extract the data of the still image data selected by the user as described later on.

Figure 7:
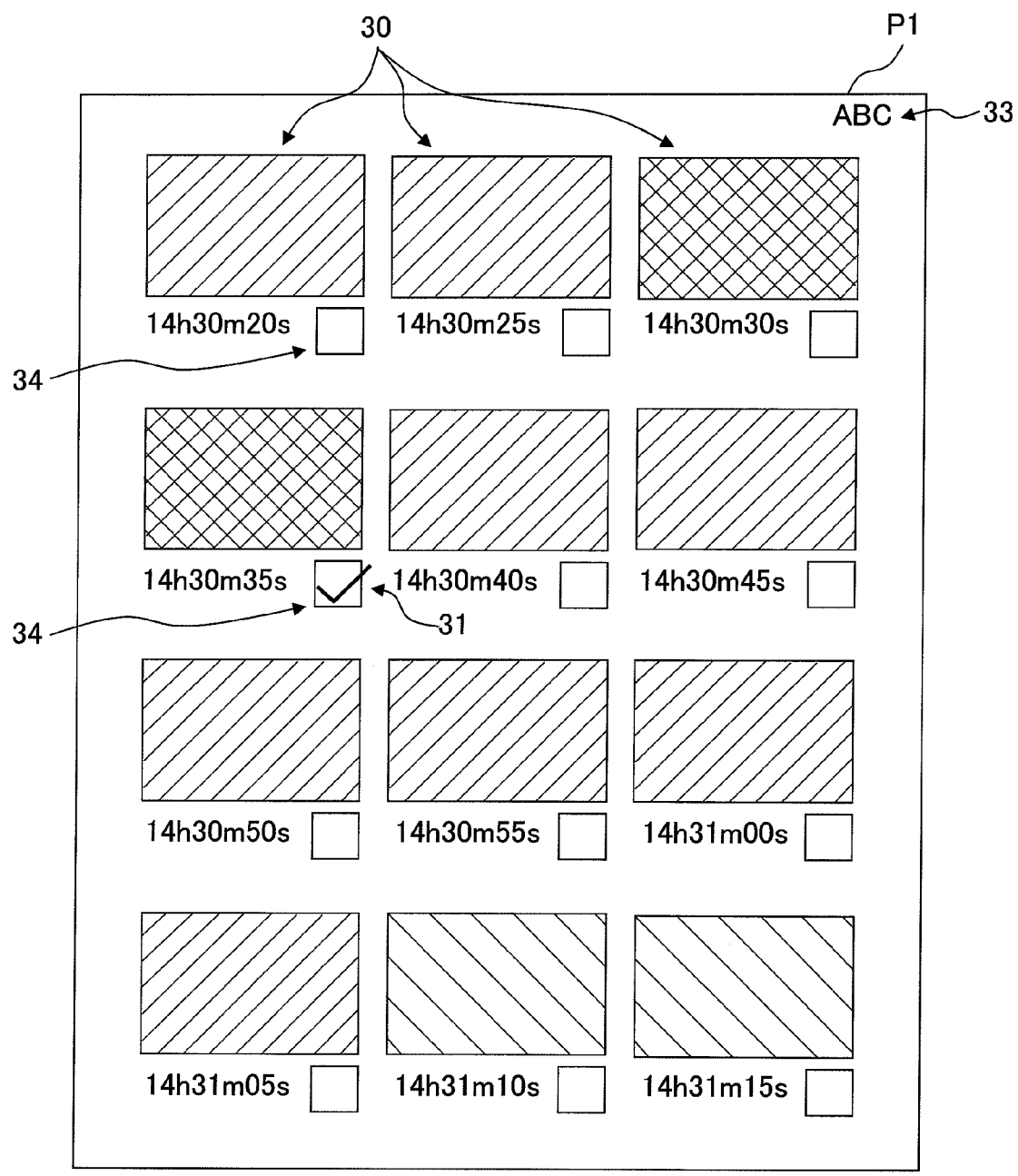
FIG. 7 shows a state in which a selection mark is marked to the printing paper sheet on which the thumbnail images are printed.

After the thumbnail images 30 are printed on the printing paper sheet P1 as described above, the image intended to be printed is selected such that the selection mark 31 is marked to the check box 34 of an arbitrary thumbnail image 30 (thumbnail image corresponding to the still image data of 14 hours 30 minutes 35 seconds in FIG. 7), for example, by manually writing the selection mark 31 by the user with a pen or the like as shown in FIG. 7.

Next, the selected image-printing process will be explained. When the printing paper sheet P1, on which the thumbnail images 30 are printed, is read by the scanner 4 by performing the predetermined operation by the user (for example, the opening of the lid section 7, the setting of the printing paper sheet P1 on the placing stand, and the input of the scanning start instruction) (S14: Yes), the selected image-extracting section 25 detects the position information about the movie image data ID 33 printed at the upper-right position of the printing paper sheet P1 and the check box 34 marked with the selection mark 31, from the image data obtained by the scanner 4.

In this procedure, if the selected image-extracting section 25 fails in the detection of the selection mark 31, for example, such that the scanning of the scanner 4 is performed without marking the selection mark 31 or the checked selection mark 31 cannot be read because it is thin (S15: No), the controller 5 displays, on the display 9, the error message which informs the user of the fact that the selection mark 31 is not marked (S16).

On the other hand, if the selected image-extracting section 25 detects the selection mark 31 (S15: Yes), the selected image-extracting section 25 firstly recognizes the movie image data from which the still image data is to be extracted, from the obtained movie image data ID 33. As described above, the check boxes 34, which correspond to the respective thumbnail images 30, are printed at the positions corresponding to the times of the original still image data of the thumbnail images 30. Accordingly, the selected image-extracting section 25 recognizes the time counted or measured in the movie image data corresponding to the check box 34, i.e., the time of the still image data required by the user to be printed, from the position of the check box 34 (thumbnail image 30) marked with the selection mark 31. Further, the number of the frame corresponding to the selection mark 31 is recognized with reference to the relationship between the frame number and the time in the movie image data stored in the correlation storage section 24. The still image data of this frame number (i.e., the to-be-printed still image data required to be printed) is extracted from the movie image data (S17: selected image-extracting step).

Figure 8:
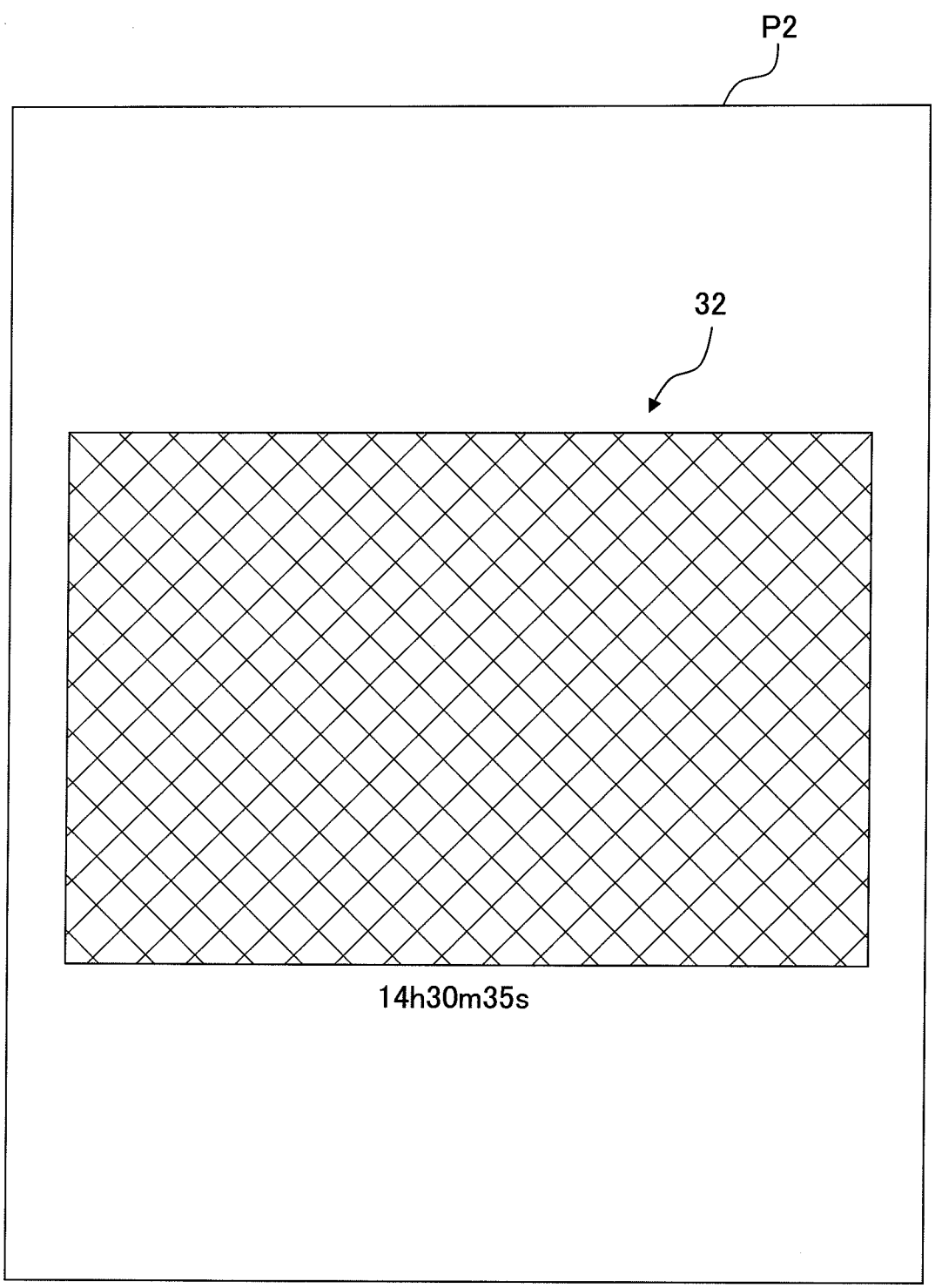
FIG. 8 shows a state in which a selected image is printed on a printing paper sheet (second printing medium).

When the to-be-printed still image data is extracted by the selected image-extracting section 25, as shown in FIG. 8, the printing head 2, which is controlled by the printing control section 20, prints the image 32 of the to-be-printed still image data together with the time counted in the movie image data (for example, 14 hours 30 minutes 35 seconds) on the printing paper sheet P2 (second printing medium) which is distinct from the printing paper sheet P1 on which the thumbnail images 30 are printed (S18: second printing step).

The number of the selection mark or marks 31 marked by the user to the printing paper sheet P1 (first printing medium) is not limited to one. A plurality of still images, which are intended to be printed, can be also selected by marking a plurality of selection marks 31. In this case, the selected image-extracting section 25 recognizes the times counted in the movie image data corresponding to the plurality of selection marks 31 respectively, and a plurality of pieces of to-be-printed still image data corresponding to the times are extracted. The printing head 2 prints the images of the plurality of pieces of the printing still image data extracted by the selected image-extracting section 25 on a plurality of printing paper sheets P2 (second printing media) respectively.

According to the multifunction printer 1 of the first embodiment described above, the following effect is obtained. The user views the list indication of the thumbnail images 30 of the plurality of pieces of the still image data printed on the printing paper sheet P1, and the user marks the selection mark 31 to select the image intended to be printed, on the printing paper sheet P1. The desired still image is automatically printed on the distinct printing paper sheet P2 by only allowing the scanner 4 to read the printing paper sheet P1 marked with the selection mark 31. Therefore, it is unnecessary for the user to perform any special operation which is not performed during the ordinary image printing in order to print the still image. Therefore, even when the user is weak in the instrument operation, the user can easily print the still image of the desired scene contained in the moving image.

The printing head 2 simultaneously prints the movie image data ID 33 (moving image identification mark) when the thumbnail images 30 are printed on the printing paper sheet P1. Therefore, when the printing paper sheet P1, which is marked with the selection mark 31, is read by the scanner 4, the selected image-extracting section 25 can recognize the movie image data from which the printing request image data is to be printed, from the movie image data ID 33 printed on the printing paper sheet P1. Therefore, it is unnecessary that the multifunction printer 1 should inquire of the user about from which movie image data the still image is to be extracted.

However, if the multifunction printer 1 can recognize from which movie image data the still image is to be extracted, by means of any other method, it is not necessarily indispensable that the printing head 2 prints the movie image data ID 33 (moving image identification mark) together with the thumbnail images 30 on the printing paper sheet P1. For example, when the printing paper sheet P1 marked with the selection mark 31 is read by the scanner 4, then a list of file names of the movie image data may be displayed on the display 9, and the user may select the movie image data from which the still image data is to be extracted. Alternatively, when the printing paper sheet P1 marked with the selection mark 31 is read by the scanner 4, then the movie image data, which is directed to the thumbnail image printing just previously, can be also regarded as the movie image data from which the still image data corresponding to the selection mark 31 is to be extracted.

The following modifications may be applied to the first embodiment described above. In the first embodiment described above, the printing head 2 simultaneously prints the plurality of check boxes 34 corresponding to the plurality of thumbnail images 30 respectively in order that the user easily marks the selection mark 31, when the plurality of thumbnail images 30 are printed on the printing paper sheet P1 (see FIGS. 6 and 7). However, the selected image-extracting section 25 can recognize the time in the movie image data from the position at which the selection mark 31 is marked irrelevant to the presence or absence of the check boxes 34, because the plurality of thumbnail images 30 are printed at the positions corresponding to the times of the corresponding pieces of the still image data respectively. Therefore, it is not necessarily indispensable that the printing head 2 should print the check boxes 34 together with the plurality of thumbnail images 30. When the check box 34 is not printed on the printing paper sheet P1 as described above, then the user may directly write the selection mark 31 on any arbitrary thumbnail image 30, or the user may mark the selection mark 31 at any position disposed around the thumbnail images 30.

The number of pieces of the still image data extracted from one piece of the movie image data becomes large depending on the total time of the movie image data and/or the time interval at which the still image data are extracted. All of the thumbnail images 30, which correspond to the pieces of the still image data, cannot be printed on one printing paper sheet P in some cases. In such a situation, the thumbnail images 30 of one piece of the movie image data are printed over a plurality of printing paper sheets P1.

In this case, at first, the still image data-extracting section 22 extracts, from the movie image data, the plurality of pieces of the still image data while dividing them into a plurality of groups. The printing control section 20 judges on which printing paper sheet the thumbnail image 30 of a certain piece of the still image data is to be printed, from the group to which the still image data belongs. The printing head 2 is controlled on the basis thereof. In other words, the thumbnail images of the plurality of pieces of the still image data belonging to a certain group are printed by the printing head 2 on one printing paper sheet P1.

Figure 9:
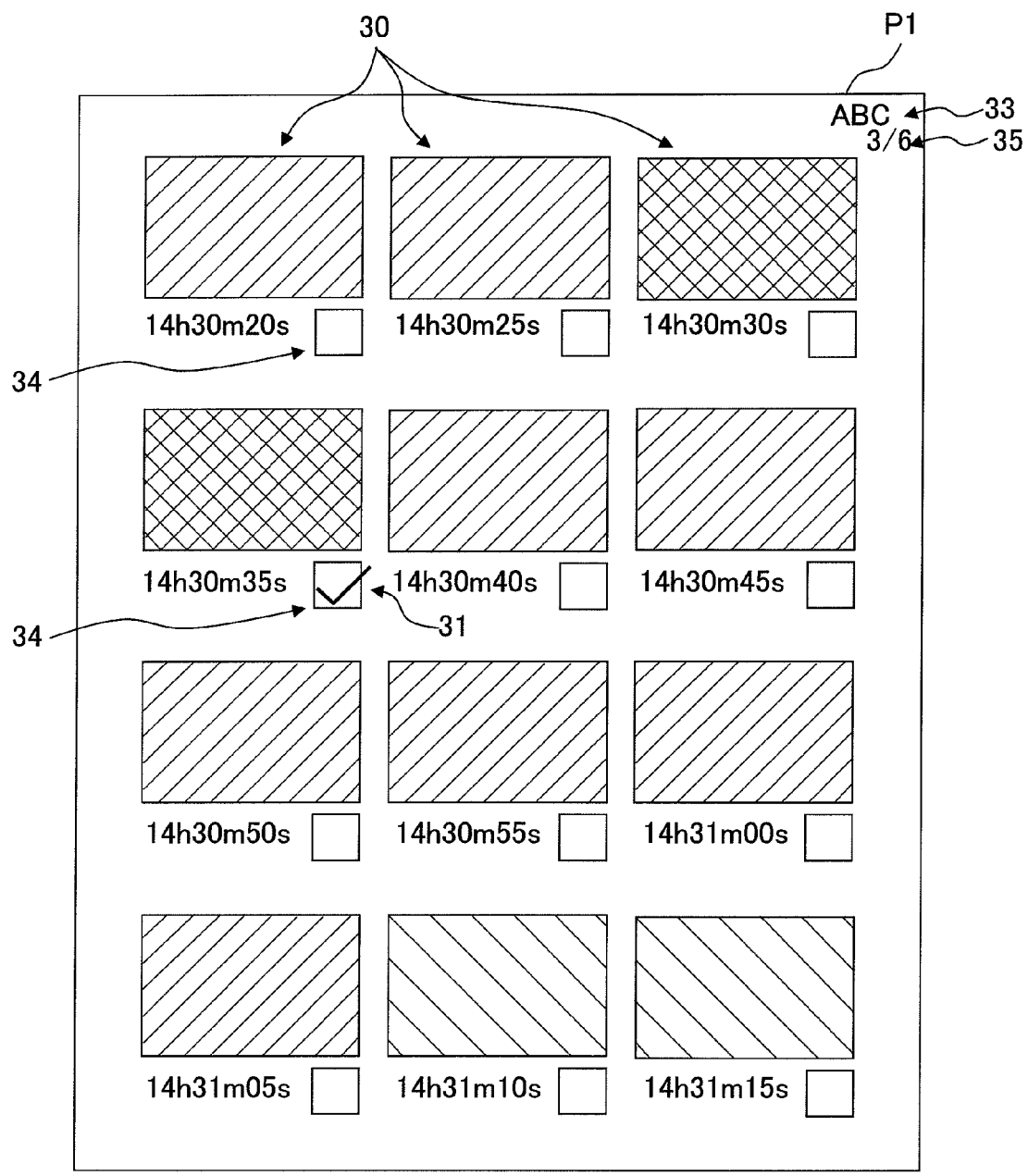
FIG. 9 shows a state in which a plurality of thumbnail images are printed on a printing paper sheet in a modified embodiment of the first embodiment.
Figure 10A:
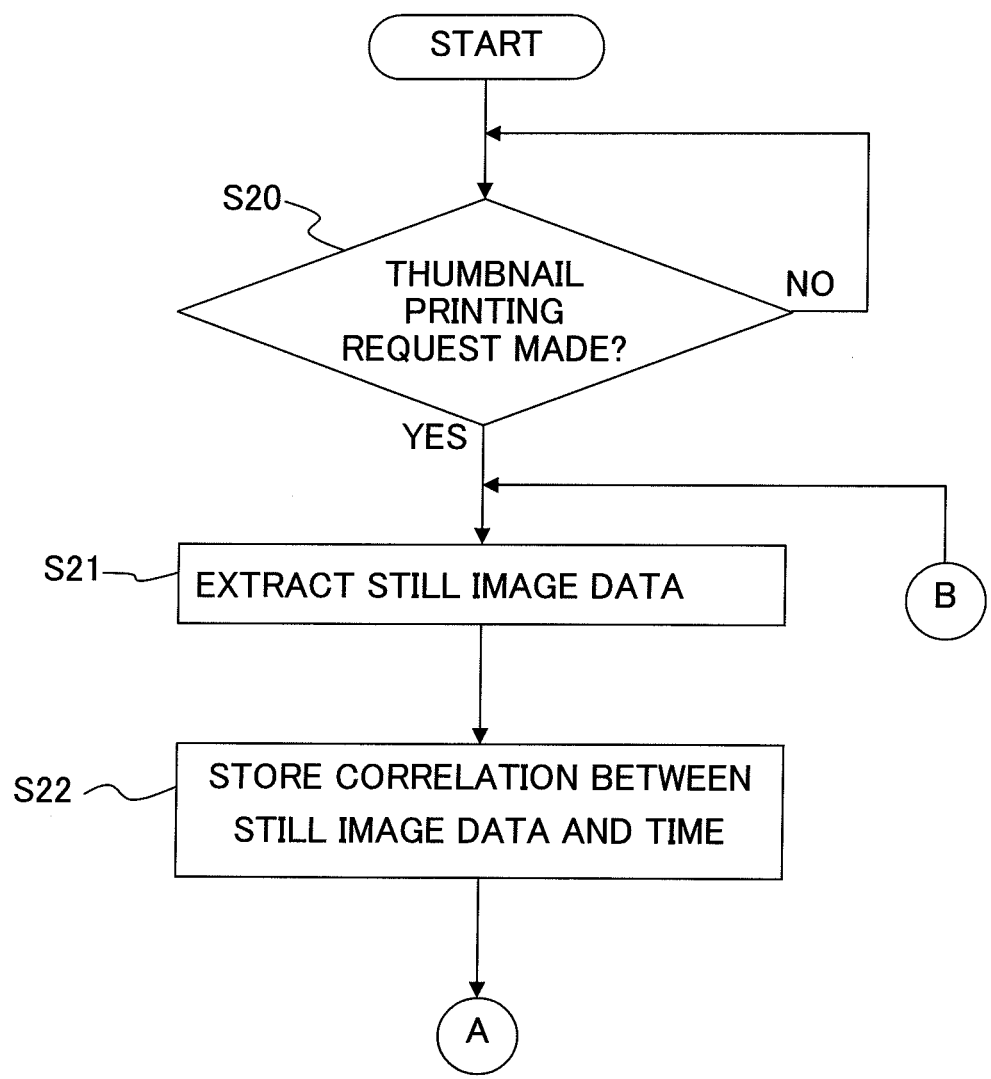
FIGS. 10A and 10B show a flow chart illustrating a still image-printing process in a second embodiment.
Figure 10B:
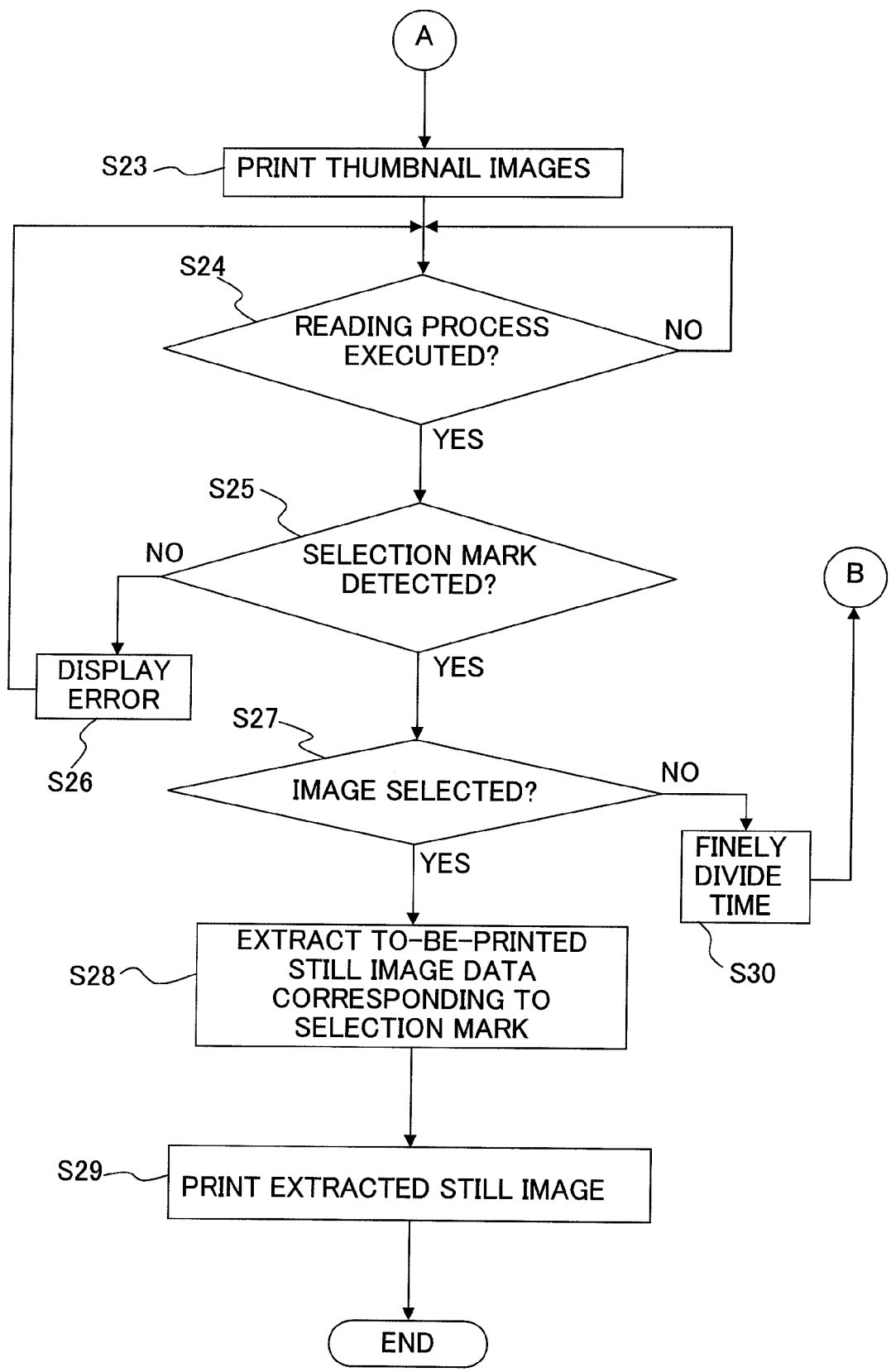

In this procedure, as shown in FIG. 9, the printing head 2 preferably prints the thumbnail images 30 of the pieces of the still image data belonging to each of the groups on one printing paper sheet P1. Further, the group identification mark 35, which corresponds to the group, is preferably printed on the same printing paper sheet P1. The group identification mark 35 of "3/6" shown in FIG. 9 indicates the third printing paper sheet P1 of the six printing paper sheets P1 in total on which the thumbnail images 30 are printed.

In this case, when the selection mark 31 is marked to any one of the plurality of printing paper sheets P1 on which the thumbnail images 30 are printed, and then the printing paper sheet P1 is read by the scanner 4, then the selected image-extracting section 25 can recognize the position at which the selection mark 31 is marked, from the image data obtained by the scanner 4, and the selected image-extracting section 25 can recognize the group from which the still image data (to-be-printed still image data) corresponding to the selection mark 31 is to be extracted, from the group identification mark 35. As described above, the printing head 2 prints the plurality of thumbnail images 30 belonging to one group and the group identification mark 35 corresponding to the thumbnail images 30, on one printing paper sheet P1. Accordingly, when the printing paper sheet P1 is read by the scanner 4 in the state in which the selection mark 31 is marked, then the multifunction printer 1 can grasp from which group the still image is to be extracted, and it is unnecessary to inquire of the user.

If the multifunction printer 1 can recognize the group from which the still image is to be extracted, by means of any other method, it is unnecessary for the printing head 2 to print the group identification mark 35 together with the thumbnail images 30 on the printing paper sheet P1. For example, the following procedure is also available. That is, when the printing paper sheet P1, to which the selection mark 31 is marked, is read by the scanner 4, then a message may be displayed on the display 9, and the user may input, from the operating section 8, which printing paper sheet P is read by the scanner 4.

Next, a second embodiment of the present invention will be explained. A multifunction printer of the second embodiment is approximately the same as that of the first embodiment described above in relation to such a basic arrangement that the thumbnail images 30 of the still image data extracted from the movie image data are shown in a list on a printing paper sheet P1, and then the image of the still image data selected by the user is printed on another printing paper sheet P2. Accordingly, in the following description, those constructed differently from those in the first embodiment will be principally explained. The components or parts, which are the same as or equivalent to those of the first embodiment described above, will be appropriately omitted from the explanation.

In order that the user can select the image most suitable for the printing (image of the scene most intended to be printed), it is preferable that pieces of the still image data are extracted at time intervals as fine as possible or as short as possible, and thumbnail images 30 thereof are shown in a list on the printing paper sheet P1 so that the most suitable image is not overlooked or missed. However, if the time interval to extract the still image data is made fine or shortened when the total time of the moving image is long, the total number of extracted pieces of the still image data is enormous. Thumbnail images 30 are to be printed over a large number of the printing paper sheets P1. It is rather difficult for the user to select the image.

In view of the above, in the multifunction printer of the second embodiment, when the request is made by the user to print thumbnail images, then pieces of the still image data are firstly extracted at rough (large) time intervals, and the thumbnail images 30 are printed on the printing paper sheet P1. After that, when the selection mark or marks 31 are marked by the user to print the thumbnail images 30 again at finer time intervals in a certain time range, then pieces of the still image data are extracted while being finely divided in relation to the time (at finer time intervals) for the designated time range, and finely divided or classified thumbnail images 30 are printed again.

An explanation will be made with reference to a flow chart shown in FIG. 10 and FIGS. 11 to 13 about a series of the still image-printing process including the thumbnail image-printing process and the selected image-printing process in the second embodiment.

At first, when the instruction, which requires the thumbnail image printing for the predetermined movie image data, is inputted from the operating section 8 by the user (S20: Yes), the still image data-extracting section 22 extracts a plurality of pieces of the still image data from the movie image data at relatively large time intervals (S21). Further, the correlation storage section 24 stores the frame numbers of the plurality of pieces of the still image data extracted by the still image data-extracting section 22, the times of the still image data as counted in the movie image data, and the thumbnail image data while allowing them to correspond to one another (S22).

Figure 11:
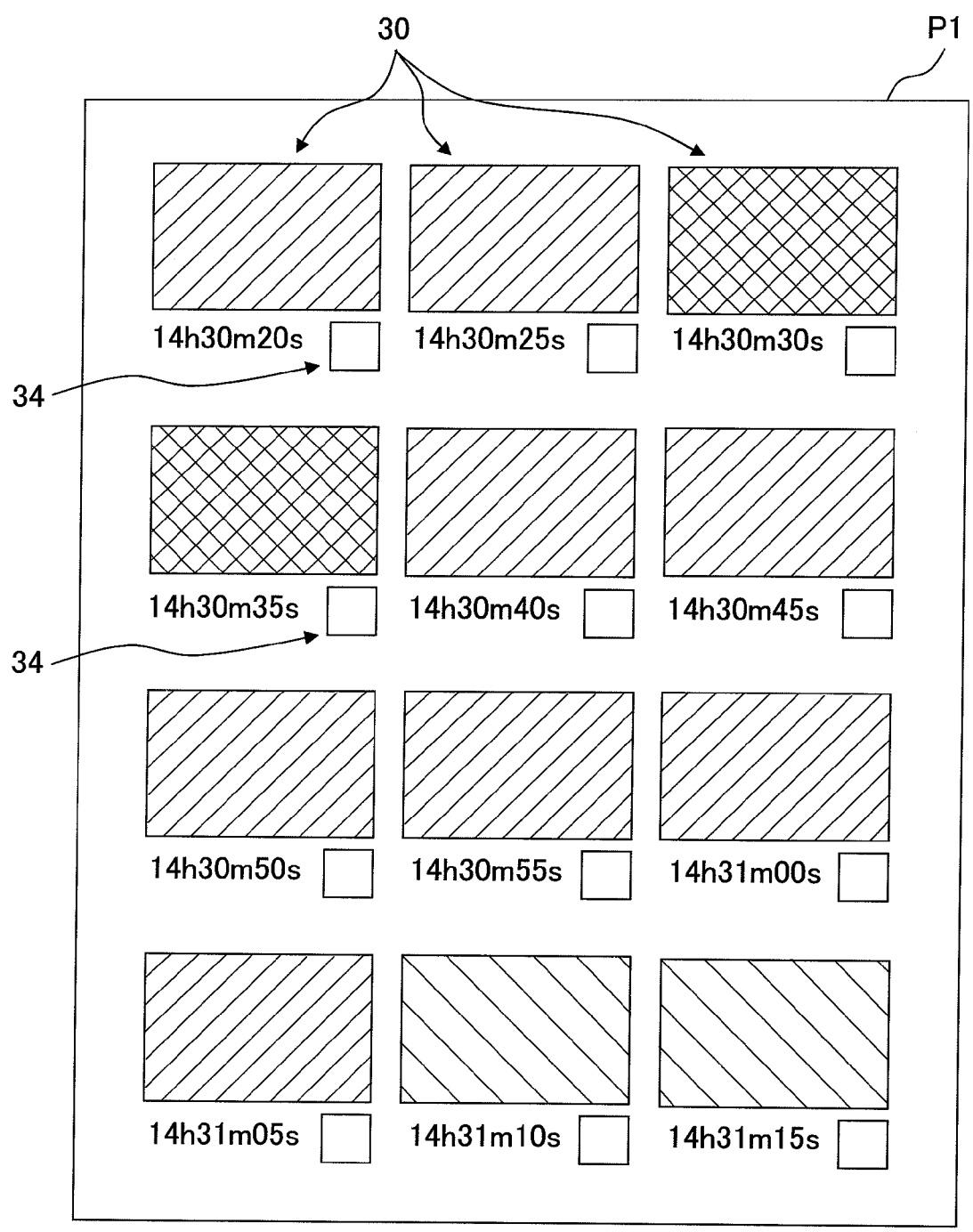
FIG. 11 shows a state in which a plurality of thumbnail images are printed on a printing paper sheet (first printing medium).

The printing head 2, which is controlled by the printing control section 20, prints the thumbnail images 30 on the printing paper sheet P1 so that the plurality of thumbnail images 30 corresponding to the plurality of pieces of the still image data are indicated as a list in correlation with the times counted in the movie image data (S23). In this procedure, the printing head 2 also prints, on the printing paper sheet P1, a plurality of check boxes 34 corresponding to the plurality of thumbnail images 30 respectively. FIG. 11 shows the printing paper sheet P1 on which twelve thumbnail images 30 are printed at time intervals of 5 seconds.

After that, when the selection mark 31 is marked to the check box 34 corresponding to an arbitrary thumbnail image 30, and then the printing paper sheet P1 is read by the scanner 4 (S24: Yes), then the selection mark 31 is detected from the image data obtained by the scanner 4 by means of the selected image-extracting section 25. However, if the selected image-extracting section 25 fails in the detection of the selection mark 31 (S25: No), the controller 5 displays, on the display 9, the error message which informs the user of the fact that the selection mark 31 is not marked (S26).

When the selected image-extracting section 25 detects the selection mark 31 (S25: Yes), the selected image-extracting section 25 judges whether the selection mark 31 indicates the selection of the to-be-printed still image data or the selection mark 31 designates a certain time range to request that the time is to be finely divided temporally in the range (S27). This judgment is performed based on the way to mark the selection mark 31 by the user.

Figure 12:
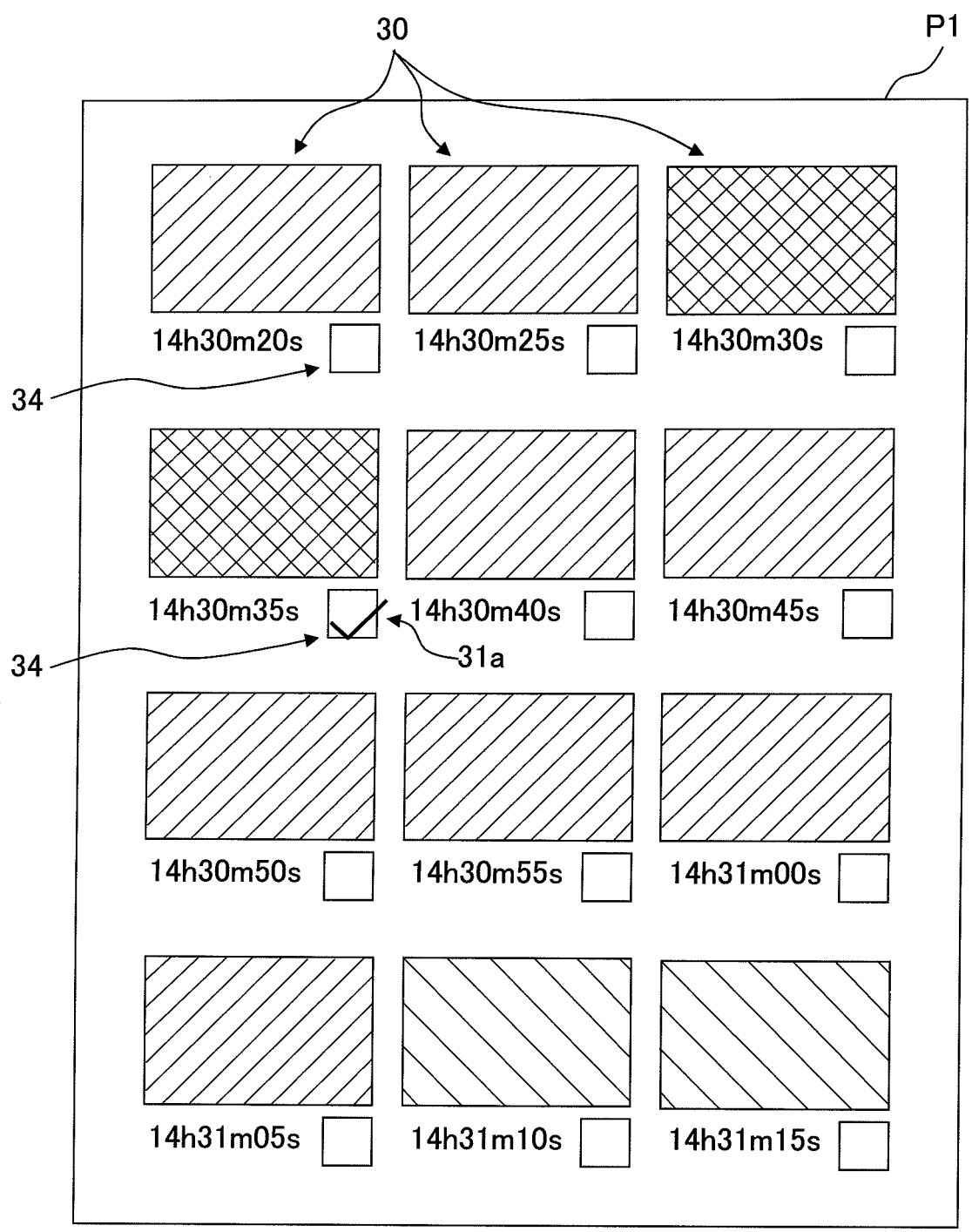
FIG. 12 shows a state in which a selection mark (first selection mark) is marked to the printing paper sheet on which the thumbnail images are printed.
Figure 13:
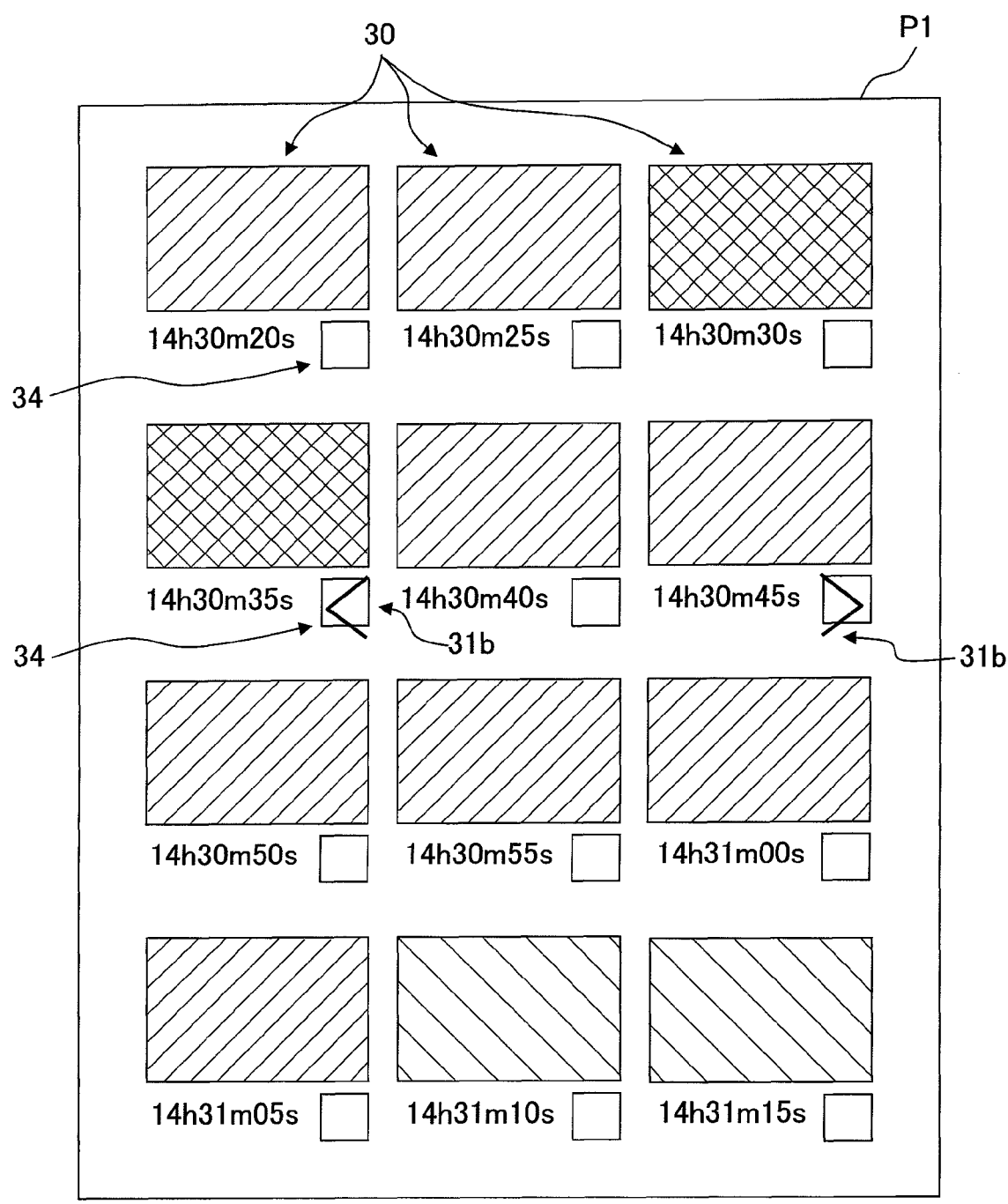
FIG. 13 shows a state in which selection marks (second selection marks) are marked to the printing paper sheet on which the thumbnail images are printed.

For example, as shown in FIG. 12, when one selection mark 31a (first selection mark) is marked to the check box 34 of a certain thumbnail image 30, the selected image-extracting section 25 judges that the selection and the printing of the still image data corresponding to the selection mark 31a are requested by the user (S27: Yes). On the other hand, as shown in FIG. 13, when two selection marks 31b (second selection marks) are marked respectively to the two check boxes 34 corresponding to the two thumbnail images 30 respectively, the selected image-extracting section 25 judges that the user requests that the time is to be finely divided between the times corresponding to the two second selection marks 31b respectively to extract the still image data again (S27: No). In this case, the user can instruct the multifunction printer 1 to display thumbnail images 30 again, the thumbnail images 30 being finely divided or classified in relation to the time within the time range between the two selection marks 31b, by performing only such a simple operation that the two selection marks 31b are marked to the printing paper sheet P1.

As shown in FIGS. 12 and 13, when the mutually different mark shapes are provided for the selection mark 31a (first selection mark) for selecting the printing image and the selection marks 31b (second selection marks) for designating the time range for the fine division, the multifunction printer 1 can perform the judgment more appropriately. For example, when two of the still images, which correspond to two of the thumbnail images 30, are intended to be printed respectively, the user also marks the selection marks 31 to the two thumbnail images 30 respectively. However, the shape of the selection mark 31a (first selection mark), which is marked in this situation, is different from that of the selection mark 31b (second selection mark) to be used when the time range, which is to be finely divided, is designated. Therefore, the selected image-extracting section 25 does not make any erroneous judgment which would be otherwise made such that pieces of the still image data are required to be extracted again at finer time intervals. In other words, it is possible to allow the selected image-extracting section 25 of the multifunction printer 1 to more correctly recognize whether the image selection or the finely divided display is requested, by only allowing the selection mark 31*a* for selecting the printing image and the selection mark 31*b* for designating the fine division to differ from each other.

Of course, when the selection mark 31 is marked by the user, if the multifunction printer 1 can recognize whether the selection mark 31 designates the selection of the printing image or the time range to be finely divided, by means of any other method, then it is unnecessary that the selection mark 31*a* for selecting the printing image and the selection mark 31*b* for designating the time range for the fine division have the different shapes. For example, when the two selection marks 31 are marked to the printing paper sheet P1, it is appropriate that a message is displayed on the display 9 to inquire of the user about whether the user requests the printing of the two images or the user requests the extraction of the finely divided or classified pieces of the still image data to print the thumbnail images 30 again.

With reference to the flow chart shown in FIG. 10 again, if it is judged by the selected image-extracting section 25 that it is requested to print the still image data corresponding to the selection mark 31 according to the selection mark 31 marked to the printing paper sheet P1 (S27: Yes), the selected image-extracting section 25 recognizes the time counted in the movie image data corresponding to the position of the check box 34 marked with the selection mark 31 (i.e., the time of the to-be-printed still image data requested by the user for the printing) in the same manner as in the first embodiment described above. Further, with reference to the correlation storage section 24, the to-be-printed still image data, which corresponds to the recognized time counted in the movie image data, is extracted from the movie image data (S28). The printing head 2 prints the image of the to-be-printed still image data extracted by the selected image-extracting section 25, on another printing paper sheet P2 (second printing medium) (S29).

Figure 14:
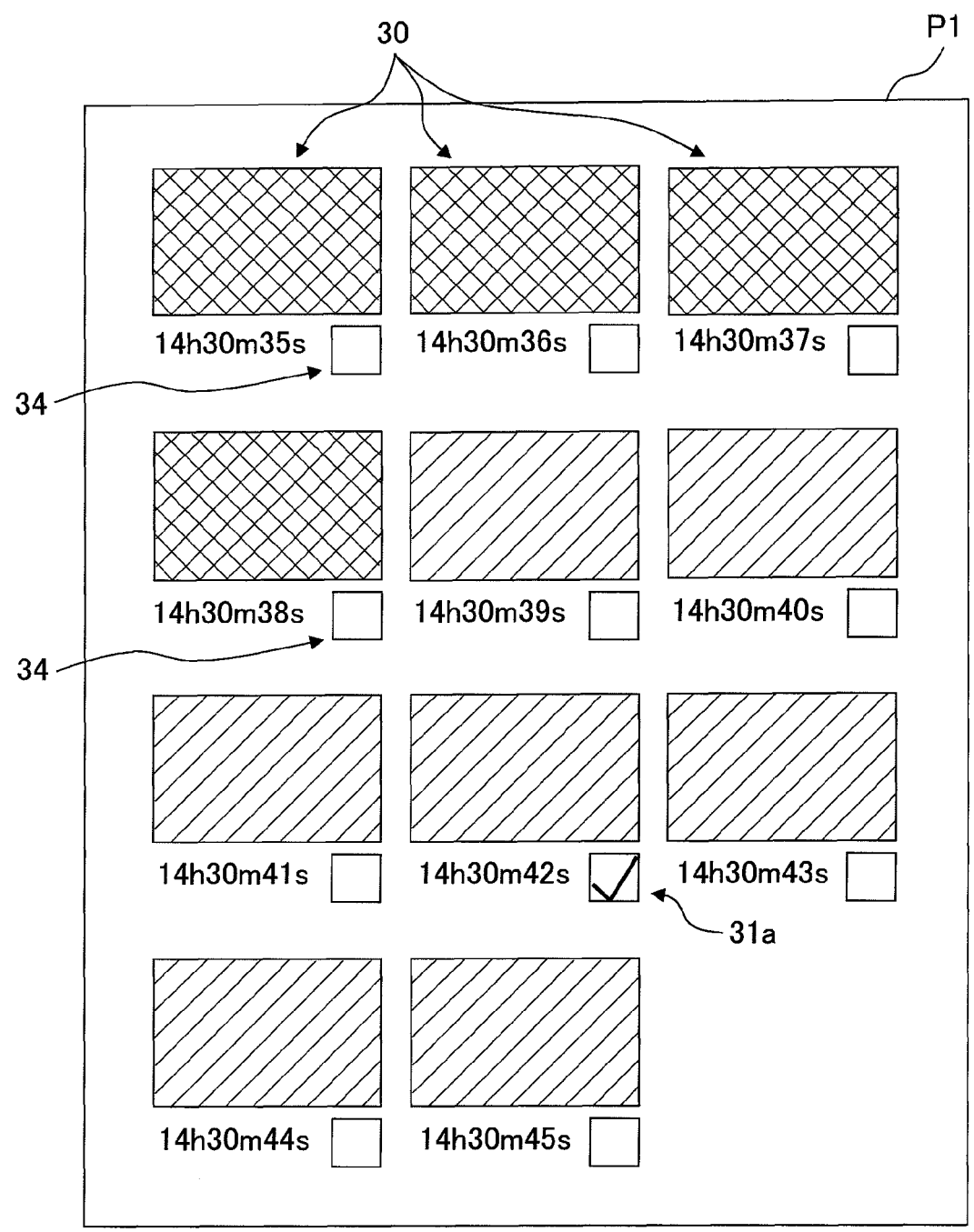
FIG. 14 shows a state in which a selection mark (first selection mark) is marked to a printing paper sheet on which finely classified thumbnail images are printed.

On the other hand, if the selected image-extracting section 25 judges that it is requested that the time is to be finely divided within a certain time range to extract the still image data again and finely divided or classified thumbnail images 30 are shown again, from the selection marks 31 marked to the printing paper sheet P1 (S27: No), then the still image data-extracting section 22 resets the time intervals to be used when the still image data are extracted from the movie image data (S30), and the time is finely divided at the newly set time intervals to extract the still image data again (S21). The correlation storage section 24 newly stores the correlation between the times and the re-extracted (finely divided) still image data (S22). The printing head 2 prints, on the printing paper sheet P1, thumbnail images 30 corresponding to the finely divided still image data (S23). For example, as shown in FIG. 14, the thumbnail images 30 are printed at the time intervals (T=1 s) finer or shorter than those used when the thumbnail images are firstly printed (T=5 s) as shown in FIG. 11.

Figure 15:
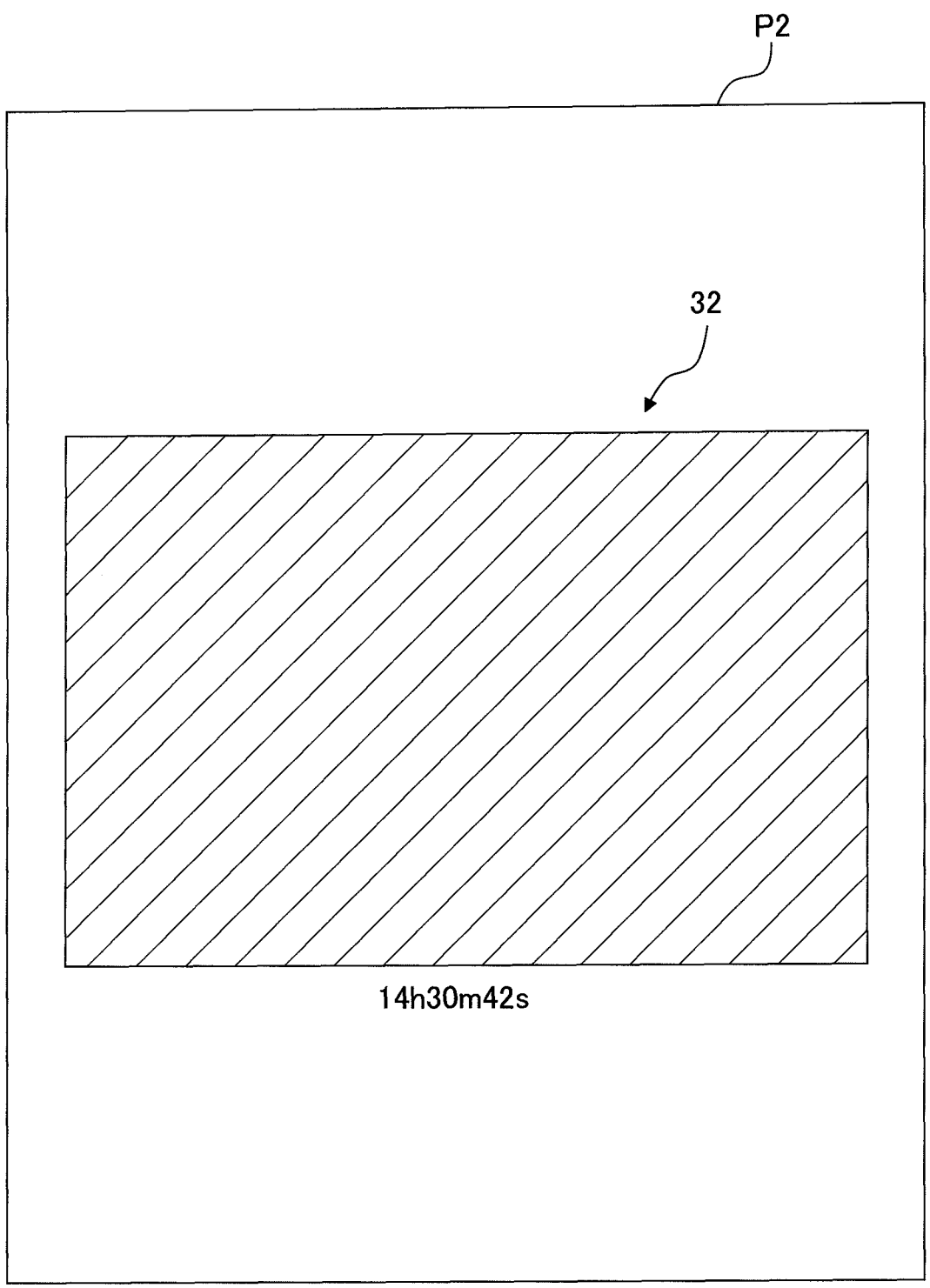
FIG. 15 shows a state in which a selected image is printed on a printing paper sheet (second printing medium).
Figure 16A:
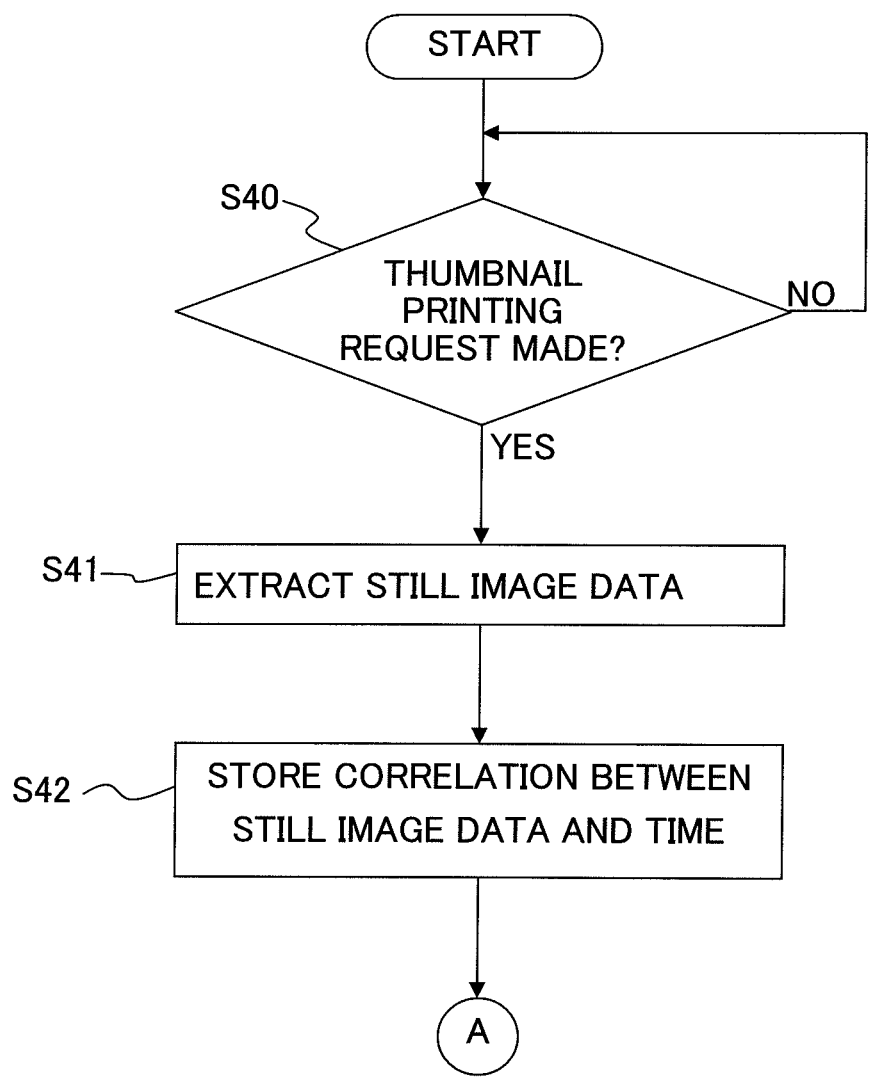
FIGS. 16A and 16B show a flow chart illustrating a still image-printing process in a third embodiment.
Figure 16B:
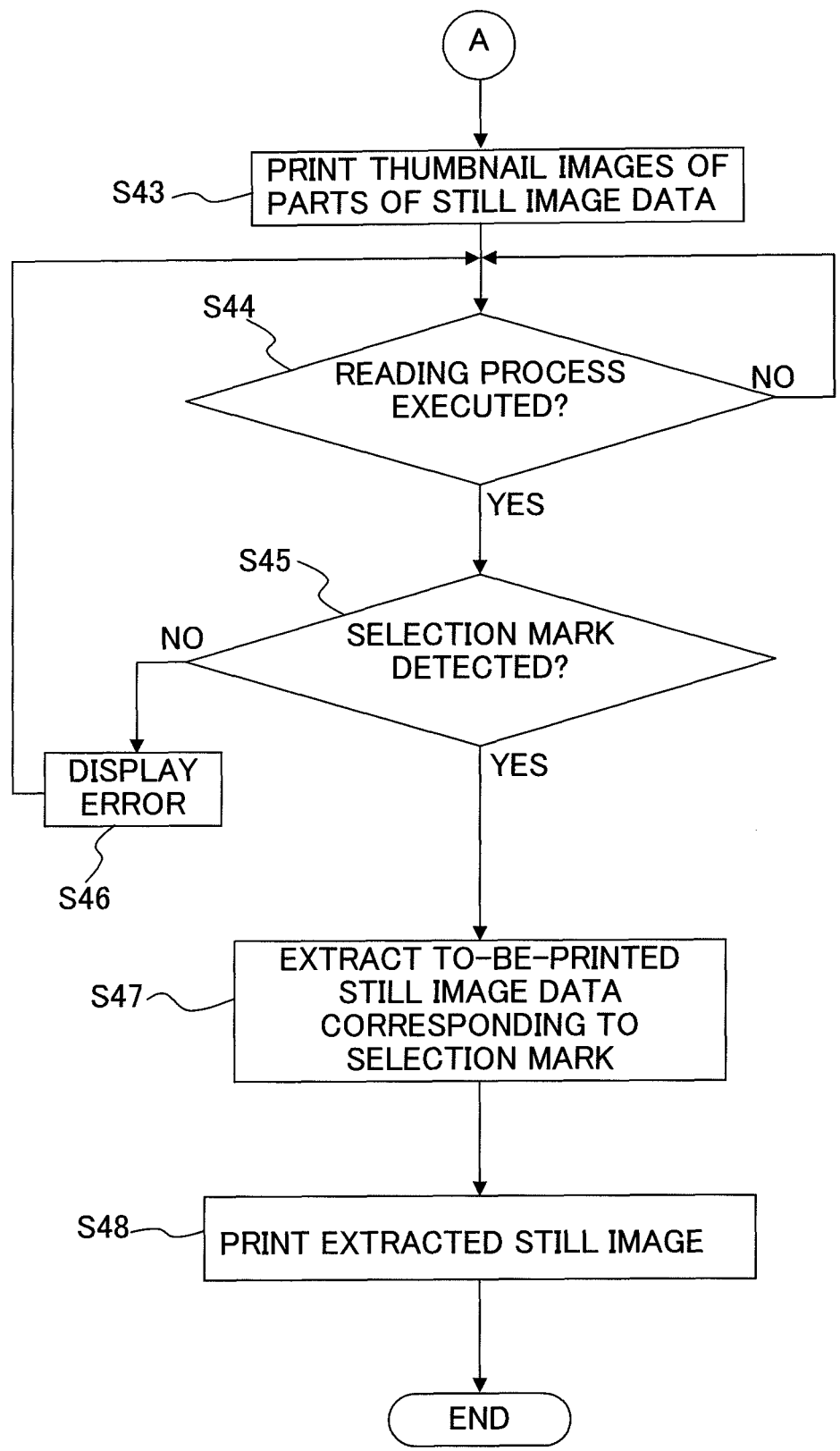

The re-extraction of the still image data as described above is repeatedly performed until it is judged that the printing image is selected (S27 is "Yes"). As shown in FIG. 14, when the selection mark 31*a* is marked to the check box 34 of a certain thumbnail image 30, and the selected image-extracting section 25 judges that the image selection is performed by the user (S27: Yes), then the to-be-printed still image data, which corresponds to the selection mark 31*a*, is extracted from the movie image data (S28). Further, as shown in FIG. 15, the printing head 2 prints the image 32 of the extracted to-be-printed still image data on the printing paper sheet P2.

According to the multifunction printer 1 of the second embodiment, the time is divided more finely within the time range designated by the user to extract the still image data, and the thumbnail images 30 of the still image data are shown in the list again. Therefore, the user can easily select the most suitable image (image of the scene most intended to be printed).

In the second embodiment explained above, the selected image-extracting section 25 judges that the time range to finely divide the still image data is designated when the two selection marks 31*b* are marked to the printing paper sheet P1. However, the judging technique is not limited to only those described above. For example, it is also appropriate to judge that the fine division is designated within a time range corresponding to a plurality of thumbnail images 30 when the selection mark or marks 31 is/are marked while ranging over two or more of the plurality of thumbnail images 30.

Next, a third embodiment of the present invention will be explained. In the case of the multifunction printer of the first embodiment described above, when the selection mark 31 is marked by the user to an arbitrary thumbnail image 30 of the plurality of thumbnail images 30 printed on the printing paper sheet P1, the selected image-extracting section 25 extracts the still image data corresponding to the thumbnail image 30 marked with the selection mark 31 as the printing image still image data.

On the other hand, a multifunction printer 1 of the third embodiment described below is different from that of the first embodiment in that the multifunction printer 1 can extract, as the printing image still image data, not only the pieces of the still image data corresponding to the thumbnail images 30 indicated in a list but also pieces of the still image data which are temporally positioned therebetween and for which no thumbnail image is printed.

An explanation will be made with reference to a flow chart shown in FIG. 16 and FIGS. 17 to 21 about a series of the still image-printing process including the thumbnail image-printing process and the selected image-printing process in the third embodiment.

At first, when the instruction, which requires the thumbnail image printing, is inputted from the operating section 8 by the user (S40: Yes), the still image data-extracting section 22 extracts a plurality of pieces of the still image data from the movie image data (S41).

Figure 17:
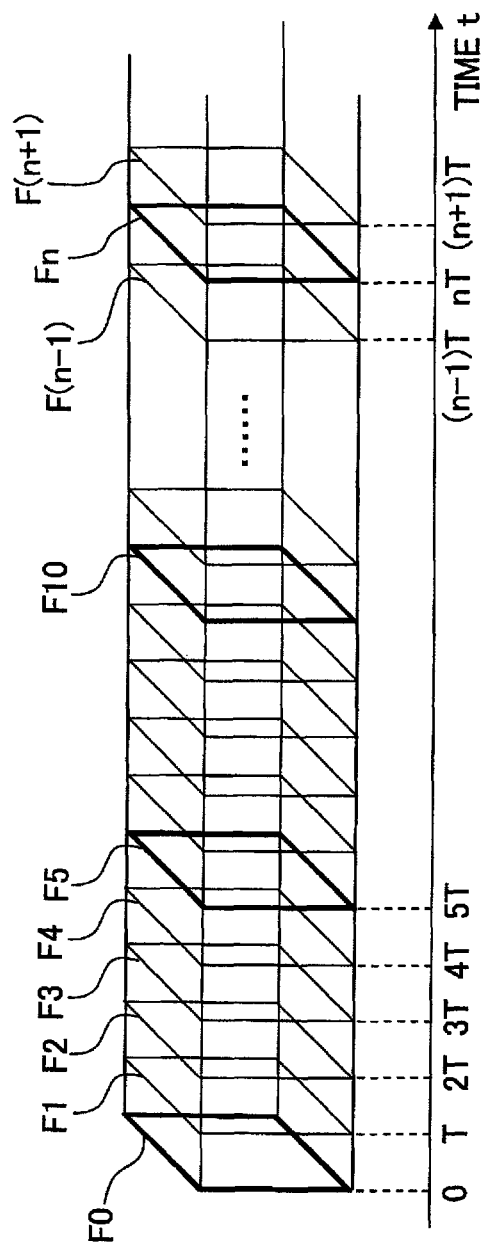
FIG. 17 conceptually shows the extraction of still image data in the third embodiment.

The still image data-extracting section 22 cuts out or slices out a plurality of pieces of the still image data (frames) at equal time intervals T from the movie image data stored in the movie image data storage section 23. That is, as shown in FIG. 17, a plurality of frames (F0, F1, F2, ..., Fn, F(n+1), ...), at which the times (points or moments of time) t as counted in the movie image data are 0, T, 2T, ..., nT, (n+1)T respectively, are extracted respectively. Further, the thumbnail image data for the list indication, in which the image size is decreased, are generated for the extracted pieces of the still image data.

However, in the third embodiment, the still image data-extracting section 22 does not prepare the thumbnail image data for all of the plurality of extracted pieces of the still image data. The still image data-extracting section 22 prepares the thumbnail image data for only parts of the pieces of the still image data. More specifically, the pieces of the thumbnail image data (DAT0, DAT5, ..., DATn) are generated for only the frames (F0, F5, ..., Fn) extracted every time intervals 5T as illustrated by thick lines in FIG. 17. No thumbnail image data is generated for the pieces of the still image data positioned temporally therebetween.

As shown in FIG. 18, the correlation storage section 24 stores the frame numbers (F0, F1, F2, ...) of the plurality of pieces of the still image data extracted by the still image data-extracting section 22, the times t as counted in the movie image data, and the thumbnail image data (DAT0, DAT5, ...) while allowing them to correspond to one another respectively (S42). However, as described above, the pieces of the thumbnail image data are generated for only the parts of the pieces of the still image data including, for example, those having the frame numbers F0, F5. Therefore, only the pieces of the thumbnail image data, which correspond to the parts of the pieces of the still image data, are stored while allowing them to correspond to the frame numbers and the times t (in FIG. 18, the symbol "-" is marked to the column of the thumbnail image data corresponding to the frame (for example, F1 and F2) for which the thumbnail image data is not generated).

When the foregoing process is completed, the printing head 2 prints the thumbnail images 30 on the printing paper sheet P1 so that the plurality of thumbnail images 30, which are included in the plurality of pieces of the extracted still image data and which correspond to the pieces of the still image data (frame numbers: F0, F5 and so on) for the list indication, are indicated as a list in correlation with the times as counted in the movie image data (S43).

Figure 19:
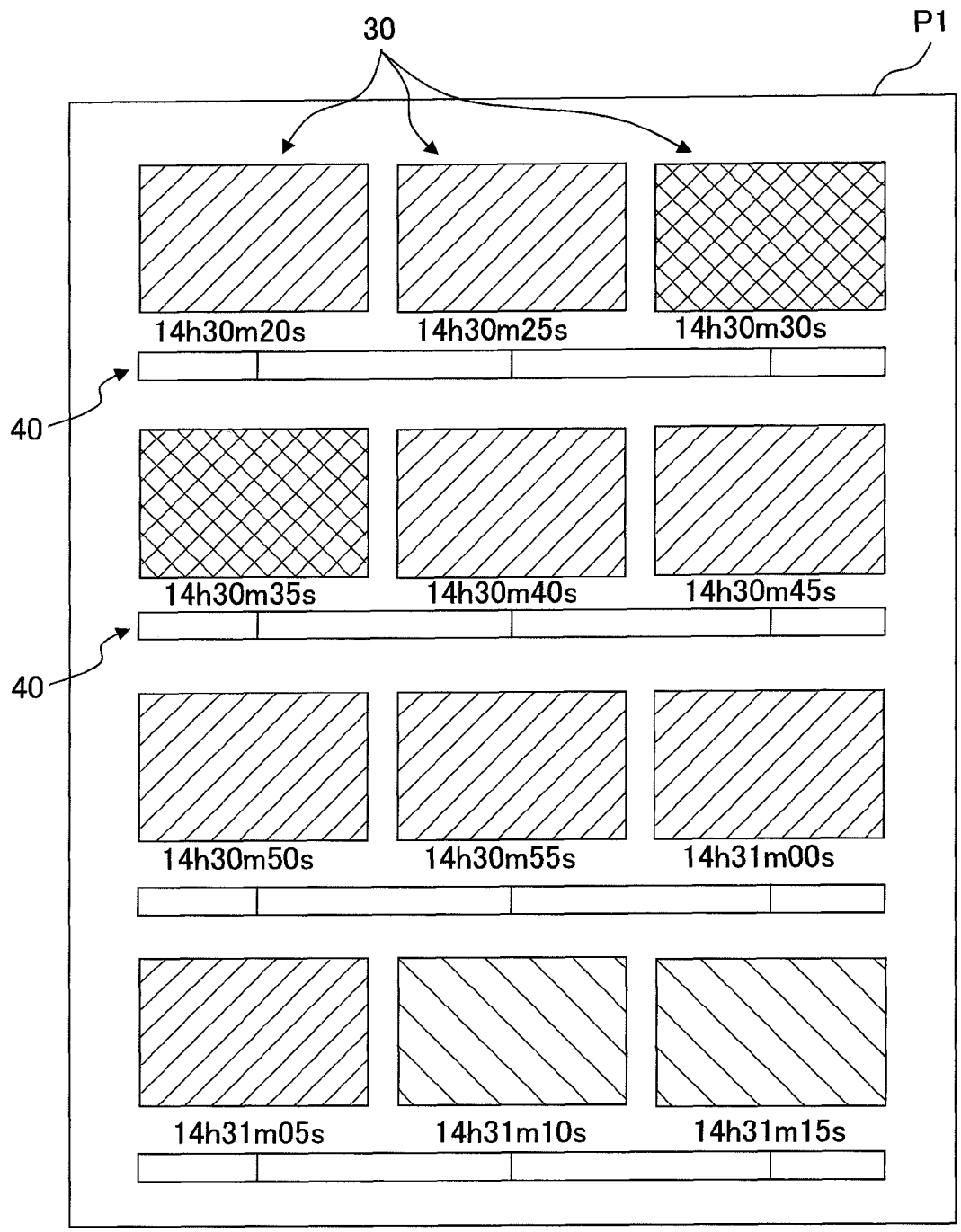
FIG. 19 shows a state in which a plurality of thumbnail images are printed on a printing paper sheet (first printing medium).

FIG. 19 shows a specified example of the printing of the plurality of thumbnail images 30. In FIG. 19, twelve of the thumbnail images 30, which are included in the thumbnail images 30 of the plurality of pieces of the still image data (frame numbers: F0, F5 and so on) for the list indication extracted at the time intervals of 5 seconds from the movie image data, are printed on one printing paper sheet P1.

As shown in FIG. 19, the printing head 2 prints the times of the original pieces of the still image data of the thumbnail images 30 at positions disposed just under the respective thumbnail images 30. Further, check columns 40, each of which extends over a plurality of (three in FIG. 19) thumbnail images 30 arranged in the widthwise direction of the printing paper, are printed thereunder. The check columns 40 are printed in correlation with the times counted in the movie image data. That is, the position of the check column 40 (position correlated with the thumbnail image 30), which is disposed just under a certain thumbnail image 30, is correlated with the time of the original piece of the still image data of the thumbnail image 30. Further, the position of the check column 40, which is disposed between the two thumbnail images 30, is correlated with the time between the two pieces of the still image data as the sources of the two thumbnail images 30.

When the thumbnail images 30 and the check columns 40 are printed on the printing paper sheet P1 as described above, as shown in FIG. 20, the user estimates the time of the image intended to be printed while making reference to the times counted in the movie image data printed under the respective thumbnail images 30. The user marks the selection mark 31 at a predetermined position of the check column 40 corresponding to the estimated time. That is, when it is intended to print the still image itself corresponding to a certain thumbnail image 30, the selection mark 31 is marked to the check column 40 at the position disposed just under the concerning thumbnail image 30. When certain two thumbnail images 30 are viewed, and it is intended to print the image of a scene expected to temporally exist therebetween, then the selection mark 31 is marked to the check column 40 at the position disposed between the two thumbnail images 30.

After that, when the printing paper sheet P1 marked with the selection mark 31 is read by the scanner 4 (S44: Yes), the selection mark 31 is detected from the image data obtained by the scanner 4 by means of the selected image-extracting section 25. However, if the selected image-extracting section 25 fails in the detection of the selection mark 31 (S45: No), the controller 5 displays, on the display 9, the error message which informs the user of the fact that the selection mark 31 is not marked (S46).

If the selected image-extracting section 25 detects the selection mark 31 (S45: Yes), the selected image-extracting section 25 recognizes the time counted in the movie image data corresponding to the selection mark 31 (i.e., the time of the still image data required by the user to be printed) from the position of the check column 40 at which the selection mark 31 is marked. The still image data of the frame number (to-be-printed still image data), which corresponds to the recognized time, is extracted from the movie image data by making reference to the relationship between the frame number and the time in the movie image data stored in the correlation storage section 24 (S47).

Figure 20:
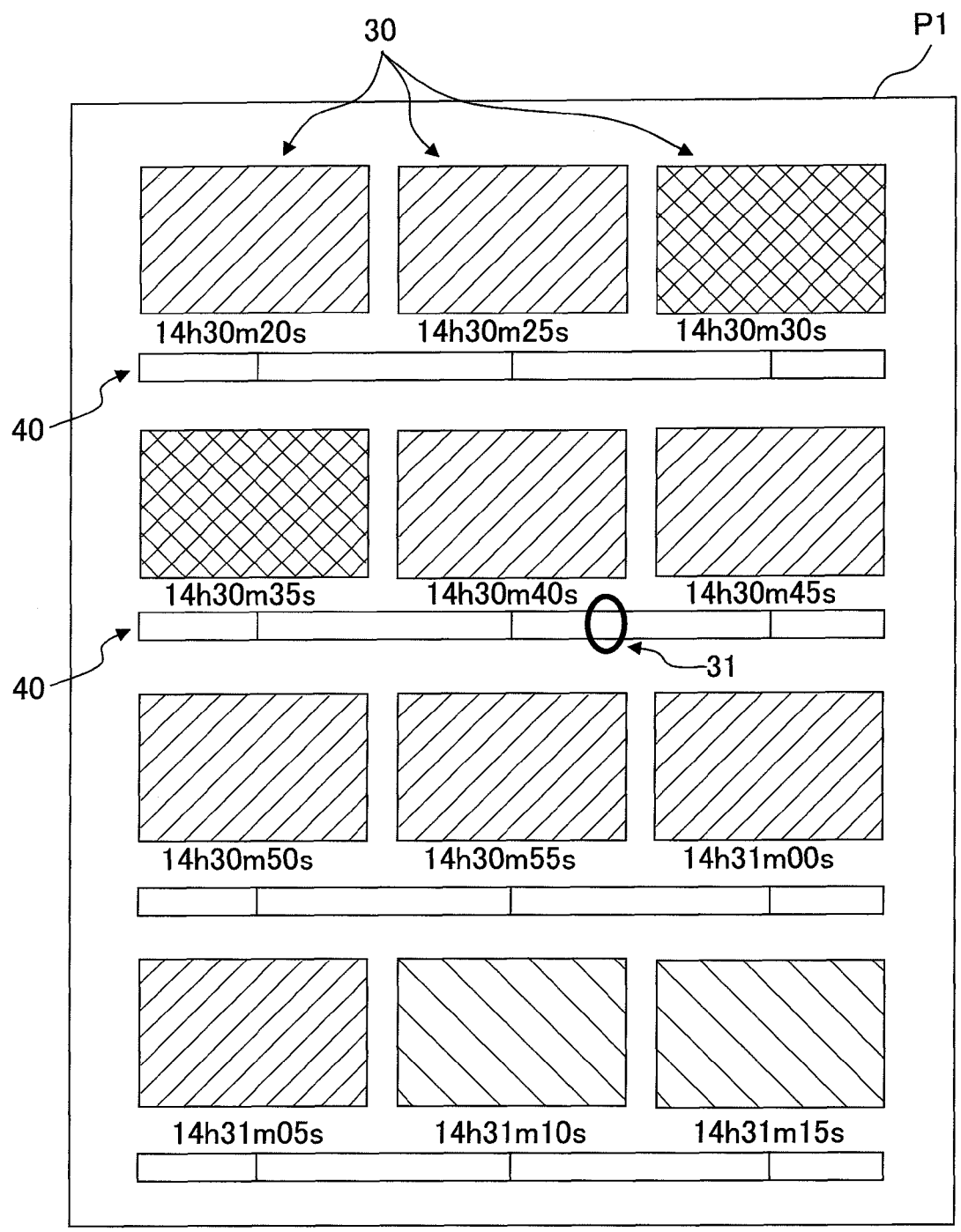
FIG. 20 shows a state in which a selection mark is marked to the printing paper sheet on which the thumbnail images are printed.
Figure 21:
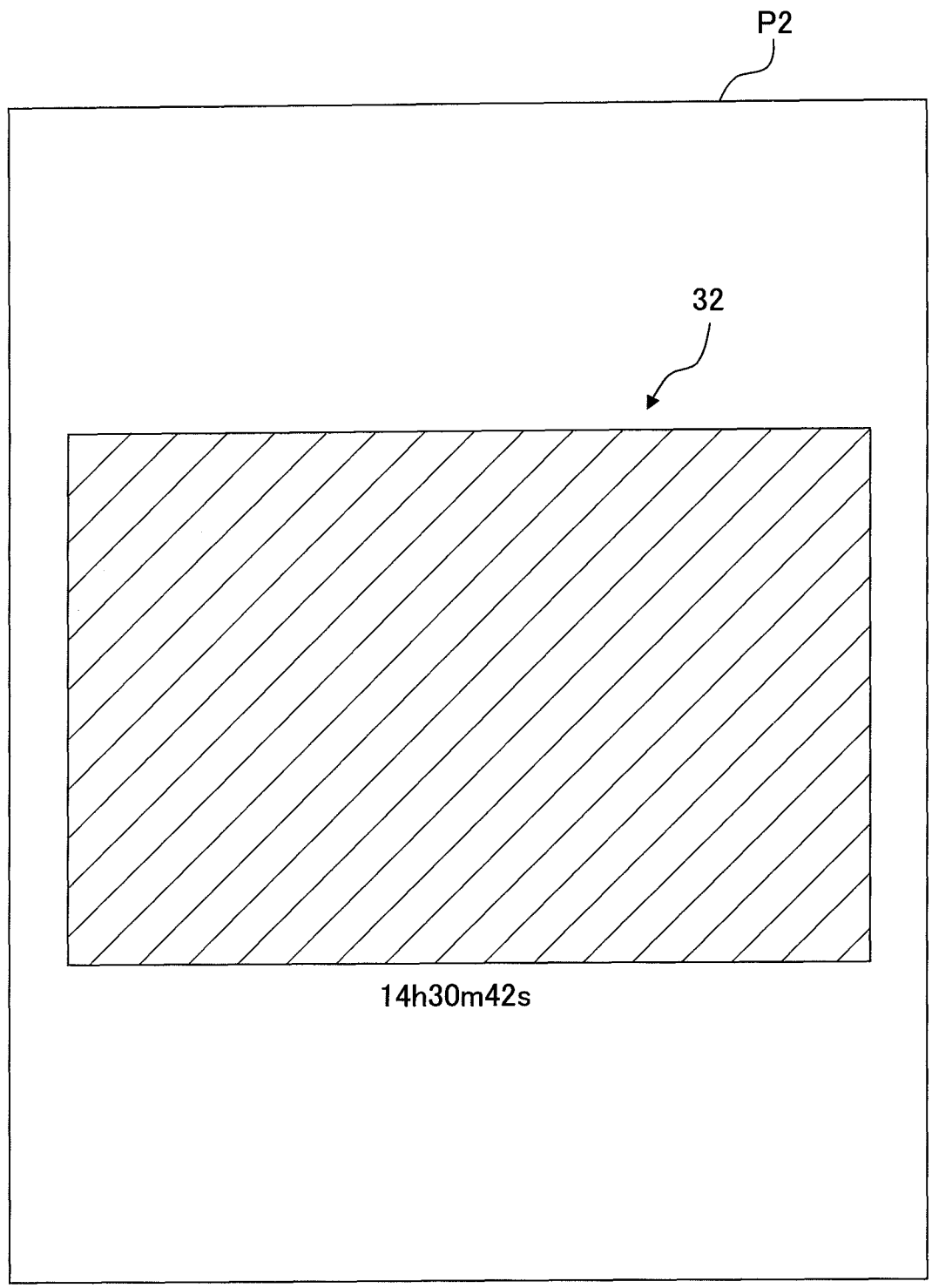
FIG. 21 shows a state in which a selected image is printed on a printing paper sheet (second printing medium).

When the selection mark 31 is marked at the position of the check column 40 corresponding to a certain thumbnail image 30 (position disposed just under the thumbnail image 30), then the selected image-extracting section 25 recognizes the time counted in the movie image data corresponding to the thumbnail image 30, and the original still image data of the thumbnail image 30 is extracted as the to-be-printed still image data. On the other hand, as shown in FIG. 20, when the selection mark 31 is marked between the positions corresponding to the two thumbnail images 30, the selected image-extracting section 25 recognizes the time between the original two pieces of the still image data of the two thumbnail images 30. In other words, the still image data (for example, the frames of F1 to F4 positioned, for example, between the frames F0 and F5 having the prepared thumbnail image data as shown in FIGS. 17 and 18), which is positioned between the two pieces of the still image data for which the thumbnail images 30 are printed, is extracted as the to-be-printed still image data.

When the to-be-printed still image data are extracted from the selected image-extracting section 25 as described above, as shown in FIG. 21, the printing head 2 prints the image 32 of the to-be-printed still image data extracted by the selected image-extracting section 25, on another printing paper sheet P2 (second printing medium) together with the time as counted in the movie image data (for example, 14 hours 30 minutes 42 seconds).

According to the third embodiment, it is possible to extract, as the to-be-printed still image data, not only the pieces of the original still image data of the displayed thumbnail images 30 but also the still image data temporally positioned between the pieces of the still image data. Therefore, the image, which is more suitable for the printing as compared with the images of the original still image data of the thumbnail images 30, can be selected by the user and printed. Considering this fact from the opposite side, the user can select the optimum image (image of the scene most intended to be printed) while increasing (roughening) the display intervals of the thumbnail images 30 and decreasing the number of the thumbnail images 30.

In the third embodiment described above, as shown in FIG. 17, the still image data-extracting section 22 extracts not only the pieces of the still image data for the list indication (still image data for generating the thumbnail images: for example, frames F0 and F5) but also the pieces of the still image data (for example, frames F1 to F4) disposed therebetween, before printing the thumbnail images 30. However, the still image data-extracting section 22 may extract only the pieces of the still image data for the list indication before printing the thumbnail images 30, and the selected image-extracting section 25 may extract the still image data corresponding to the time, for the first time when the time between the pieces of the still image data for the list indication is designated by the user.

The plurality of thumbnail images 30 are printed respectively at the positions correlated with the times of the corresponding pieces of the still image data. Therefore, the selected image-extracting section 25 can recognize the time counted in the movie image data corresponding to the selection mark 31 on condition that it is possible to distinguish the position of the selection mark 31 marked to the printing paper sheet P1, irrelevant to the presence or absence of the check column 40. Therefore, it is not necessarily indispensable that the printing head 2 prints the check columns 40 together with the plurality of thumbnail images 30. When the check column 40 is not printed on the printing paper sheet P1 as described above, then the user may directly write the selection mark 31 into an arbitrary thumbnail image 30, or the user may mark the selection mark 31 to a position disposed between two thumbnail images 30.

Next, a fourth embodiment of the present invention will be explained. In the first to third embodiments described above, the multifunction printer 1 (or the controller 5 thereof) performs all of the process for printing the still image. However, it is not necessarily indispensable that all of the process for printing the still image is performed by the multifunction printer singly. That is, the process for printing the still image may be realized by an entire printing system including the multifunction printer and an external control unit or controller which controls the multifunction printer.

Figure 22:
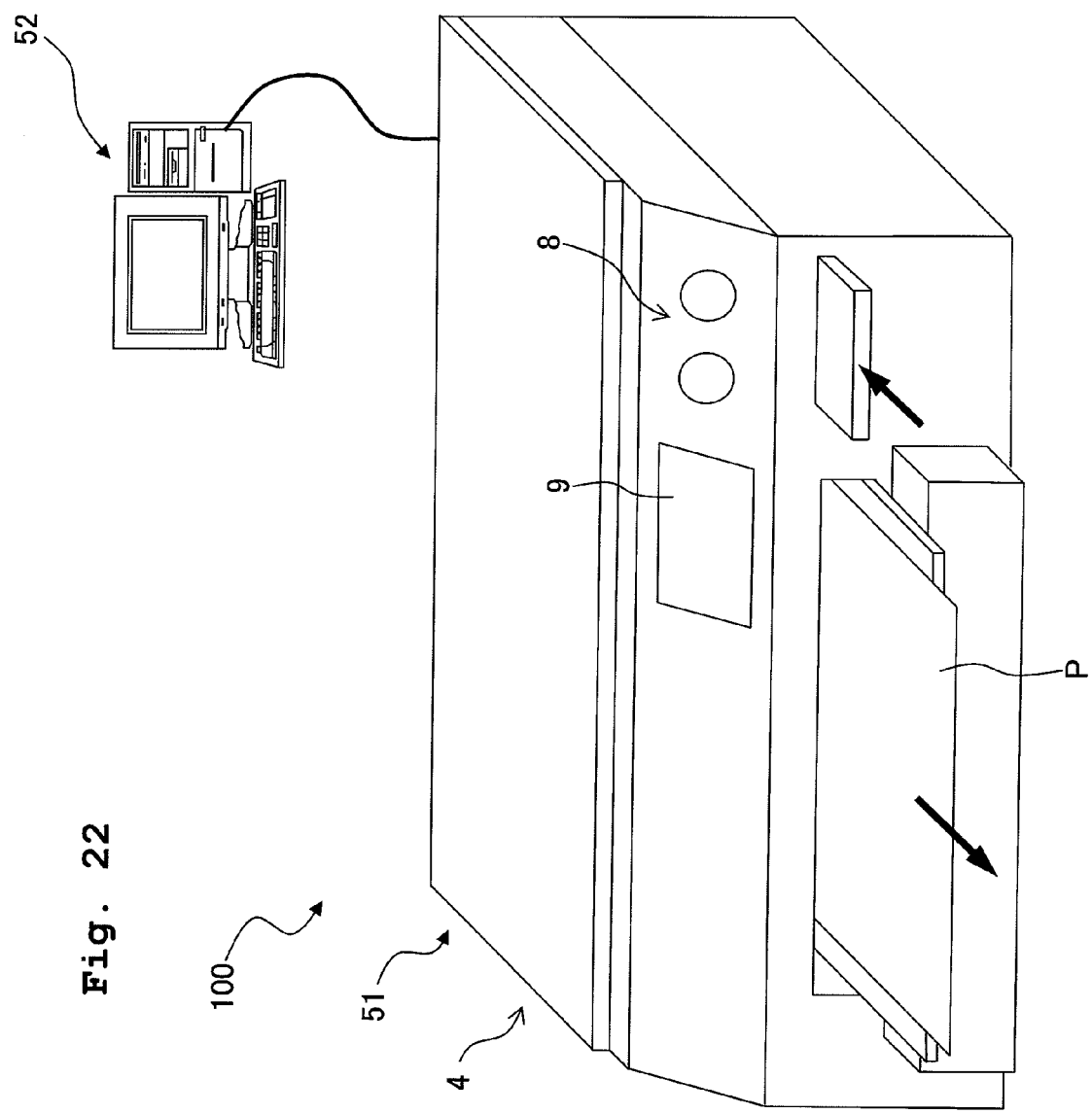
FIG. 22 shows a schematic arrangement illustrating a printing system according to a fourth embodiment.
Figure 23:
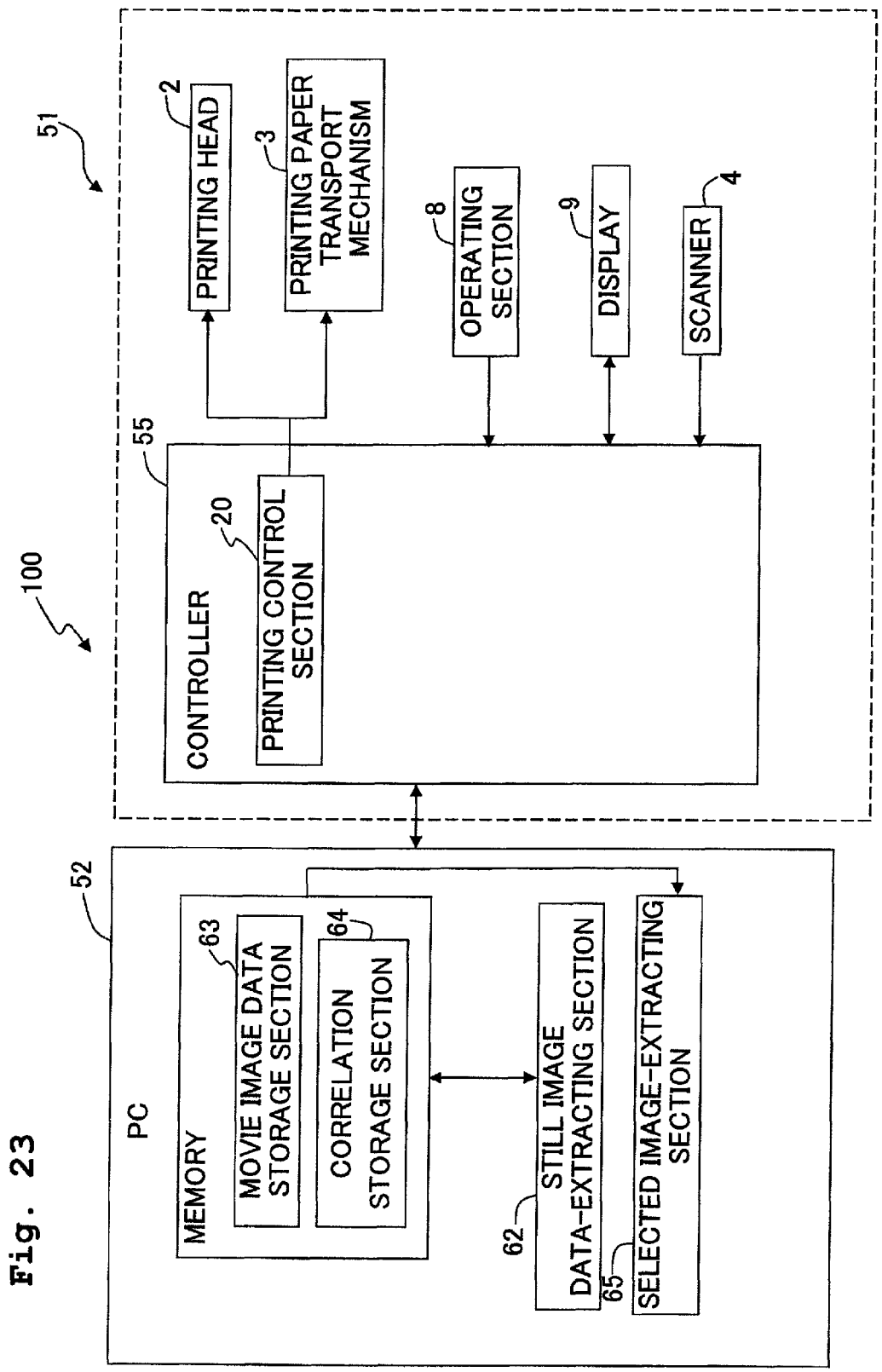
FIG. 23 shows a block diagram schematically illustrating an electric configuration of the printing system of the fourth embodiment.

As shown in FIGS. 22 and 23, the printing system 100 of the fourth embodiment comprises a multifunction printer 51 which has the printing head 2 (printing means) and the scanner 4 (image-reading means), and a personal computer 52 (PC: control unit or controller) which controls the multifunction printer 51.

The multifunction printer 51 has the printing head 2 and the scanner 4 as well as the printing paper transport mechanism 3, the operating section 8, the display 9, the controller 55 for controlling them, and other components. However, the multifunction printer 51 is principally constructed in the same manner as in the first embodiment described above. Therefore, any explanation thereof will be omitted. PC 52 is provided with, for example, CPU, ROM, RAM, and a mass storage device such as a hard disk. The mass storage device stores various types of data including, for example, movie image data and various application programs to be executed by CPU.

In the fourth embodiment, the still image data-extracting section 62, the movie image data storage section 63, the correlation storage section 64, and the selected image-extracting section 65, which are provided in the controller of the multifunction printer in the first embodiment described above, are provided in PC 52. The still image data-extracting section 62, the movie image data storage section 63, the correlation storage section 64, and the selected image-extracting section 65 are constructed, for example, by CPU, ROM, RAM, and the mass storage device of PC 52. In other words, the program, which is stored in the mass storage device of PC 52, allows CPU of PC 52 to execute, for example, the still image data-extracting step for extracting a plurality of pieces of the still image data from the movie image data (S11 shown in FIG. 3), the storing step of storing the plurality of pieces of the still image data and the times thereof while allowing them to correspond to one another (S12), and the selected image-extracting step of extracting the printing image still image data from the selection mark 31 marked by the user (S17).

According to the arrangement of the fourth embodiment, the function and the effect, which are to be consequently realized, are approximately the same as those of the first embodiment described above, in spite of such a difference that parts of the processes, which include, for example, the extraction of the still image data and the extraction of the selected image, are performed on the side of PC 52. That is, it is unnecessary for the user to perform any special operation which is not performed in the ordinary image printing. Therefore, even when the user is weak in the instrument operation, the user can easily print the still image of the desired scene selected from the moving image.

It is unnecessary that all of the still image data-extracting section, the movie image data storage section, the correlation storage section, and the selected image-extracting section are provided on the side of PC. Only a part or parts thereof may be provided in PC, and the remaining may be provided in the controller of the multifunction printer in the same manner as in the first embodiment described above.

In the embodiments of the present invention described above, the correlation storage section 24, 64 stores the frame numbers of the plurality of pieces of the still image data, the times t of the pieces of the still image data as counted in the movie image data, and the pieces of the thumbnail image data while allowing them to correspond to one another. However, it is not necessarily indispensable to store the time t of each of the pieces of the still image data as counted in the movie image data. In this case, the printing control section 20 may control the printing head 2 so that the predetermined thumbnail image 30 is printed based on the frame number in place of the time t counted in the movie image data. Further, the selected image-extracting section 25, 65 may recognize the frame number of the movie image data without recognizing the time t counted in the movie image data, from the check result of the user, when the printing paper sheet, on which the check is made, for example, by being written by the user, is read in the selected image-printing process.

In the embodiments of the present invention described above, when the thumbnail images are printed in the thumbnail image-printing process (S13, S23, S43), the times of the pieces of the still image data are also printed together therewith. However, in place of this procedure, the frame numbers may be printed.

In the embodiments of the present invention described above, when the thumbnail images are printed in the thumbnail image-printing process (S13, S23, S43), the movie image data ID 33 and/or the group identification mark 35 are also printed together with the thumbnail images on the printing paper sheet P1. In order to increase the reading accuracy or the recognition speed of the scanner 4 during the reading process (S14, S24, S44), symbols or marks indicating the left, right, top and bottom of the printing paper sheet P1 may also be printed on a margin of the printing paper sheet P1. Alternatively, the movie image data ID 33 and/or the group identification mark 35 may be printed on the printing paper sheet P1 as marks which also indicate the left, right, top and bottom of the printing paper sheet P1.

What is claimed is:

1. A multifunction printer comprising:
a scanner which reads an image printed on a printing medium;
a still image data-extracting section which extracts a plurality of still image data, to be shown in a list, from inputted movie image data based on a predetermined time interval;
a memory which stores a correlation between the plurality of the still image data extracted by the still image data-extracting section and time positions of the plurality of the still image data in the movie image data;
a printing head which prints, on a sheet of first printing media, a plurality of thumbnail images corresponding to the plurality of the still image data extracted by the still image data-extracting section and the time positions in the movie image data so that the plurality of thumbnail images and the time positions in the movie image data are shown in the list; and
a selected image-extracting section which identifies a specific time position among the time positions in the movie image data, the specific time position corresponding to a first-form selection mark marked by a user on the sheet of the first printing media based on the time positions printed on the sheet of the first printing media, when the sheet of the first printing media is scanned by the scanner after the first-form selection mark has been marked on the sheet of the first printing media by the user, and which extracts a piece of still image data, among the plurality of the still image data, corresponding to the specific time position in the movie image data based on the correlation stored in the memory, as a to-be-printed still image data of which image is to be printed,
wherein the printing head prints, on the sheet of the first printing media, a movie image identification mark for identifying the movie image data from which the plurality of still image data have been extracted by the still image data-extracting section, together with the plurality of thumbnail images corresponding to the plurality of still image data;
the movie image identification mark printed on the sheet of the first printing media is scanned together with the first-form selection mark;
the selected image-extracting section identifies the movie image data from which the to-be-printed still image data is to be extracted, based on the movie image identification mark printed on the sheet of the first printing media; and
the printing head prints, on a second printing medium, the image of the to-be-printed still image data extracted by the selected image-extracting section,
wherein, when each of two positions on one sheet of the first printing media is marked with a second-form selection mark, which is different from the first-form selection mark,
the still image data-extracting section finely divides a time position range of between time positions in the movie image data in a time-sequential manner, the time positions corresponding to the two positions marked with the second-form selection marks on the one sheet of the first printing media, to further extract a plurality of still image data only from the time position range, and
the printing head prints thumbnail images corresponding to the plurality of still image data extracted by the still image data-extracting section only from the time position range on another sheet of the first printing media.

2. The multifunction printer according to claim 1, wherein the still image data-extracting section extracts the plurality of the still image data from the movie image data while dividing the plurality of the still image data into a plurality of still-image data groups;
the printing head prints, on the sheet of the first printing media, a group identification mark corresponding to one of the still-image data groups together with the thumbnail images of still image data belonging to the one of the still-image data groups; and
the selected image-extracting section identifies a specific still-image data group among the still-image data groups, from which the to-be-printed still image data is to be extracted, based on the group identification mark printed on the sheet of the first printing media.

3. The multifunction printer according to claim 1, wherein, when two positions on the one sheet of the first printing media are marked with the first-form selection mark respectively, the selected image-extracting section extracts two pieces of the still image data at time positions corresponding to the two positions each marked with the first-form selection mark, as two pieces of the to-be-printed still image data from the movie image data.

4. A printing system comprising the multifunction printer as defined in claim 1, and a controller which controls the multifunction printer.

5. The multifunction printer according to claim 1, wherein the printing head is configured to print one of symbols and marks which indicate the left, right, top, and bottom of the sheet of the first printing media on a margin of the sheet of the first printing media together with the plurality of thumbnail images.

6. A non-transitory computer readable medium storing a still image-printing program which is usable for a multifunction printer including a printing head printing an image on a printing medium and a scanner reading the image printed on the printing medium, which is usable for extracting still image data from movie image data to print the still image data, and which causes the multifunction printer to execute steps comprising:
a still image data-extracting step for extracting a plurality of pieces of the still image data, which are to be shown in a list, from the movie image data based on a predetermined time interval;
a storing step for storing, in a memory, a correlation between the plurality of pieces of the still image data extracted in the still image data-extracting step and time positions of the plurality of pieces of the still image data in the movie image data;
a first printing step of printing, on a sheet of first printing media, a plurality of thumbnail images and the time positions in the movie image data corresponding to the plurality of pieces of the still image data extracted in the still image data-extracting step with the printing head so that the plurality of thumbnail images and the time positions in the movie image data are indicated in the list;
a selected image-extracting step for identifying the time position in the movie image data corresponding to a first-form selection mark when the sheet of the first printing media is read by the scanner after the first-form selection mark has been marked by a user to the sheet of the first printing media based on the time positions printed on the sheet of the first printing media, and extracting, as to-be-printed still image data from the movie image data, a piece of the still image data corresponding to the identified time position in the movie image data based on the correlation stored in the memory; and a second printing step of printing, on a second printing medium, a still image of the to-be-printed still image data extracted in the selected image-extracting step, by the printing head, wherein, in the first printing step, a movie image identification mark to identify the movie image data, from which the plurality of pieces of the still image data, corresponding to the plurality of thumbnail images to be printed on the sheet of the first printing media have been extracted, is printed together with the plurality of thumbnail images by the printing head on the sheet of the first printing media;

the movie image identification mark is scanned by the scanner together with the first-form selection mark; and in the selected image-extracting step, the movie image data, from which the to-be-printed still image data is to be extracted, is identified by the movie image identification mark printed on the sheet of the first printing media, wherein, when each of two positions on one sheet of the first printing media is marked with a second-form selection mark, which is different from the first-form selection mark, a range of time positions in the movie image data corresponding to a range between the two positions each marked with the second-form selection mark is finely divided temporally to further extract a plurality of still image data only from the range of time positions in the still image data-extracting step, and thumbnail images corresponding to the plurality of still image data extracted only from the range of time positions in the still image data-extracting step are printed on another sheet of the first printing media by the printing head in the first printing step.

7. The non-transitory computer readable medium according to claim 6, wherein the plurality of pieces of the still image data are extracted from the movie image data, while dividing the plurality of pieces of the still image data into a plurality of groups in the still image data-extracting step; a group identification mark corresponding to one of the plurality of groups, is printed on one sheet of the first printing media together with the thumbnail images of the pieces of the still image data belonging to the one of the groups by the printing head in the first printing step; and the group, from which the to-be-printed still image data is to be extracted, is identified by the group identification mark printed on the one sheet of the first printing media in the selected image-extracting step.

8. The non-transitory computer readable medium according to claim 6, wherein, when two positions on the one sheet of the first printing media are marked with the first-form selection mark respectively, two pieces of the still image data are extracted at time positions corresponding to the two positions each marked with the first-form selection mark, as two pieces of the to-be-printed still image data from the movie image data in the selected image-extracting step.

9. The non-transitory computer readable medium according to claim 6, wherein, in the first printing step, symbols or marks, which indicate the left, right, top, and bottom of the sheet of the first printing media, are printed on a margin of the sheet of the first medium media, together with the plurality of thumbnail images.

* * * * *